(12) United States Patent
Yanagihara et al.

(10) Patent No.: US 6,763,037 B1
(45) Date of Patent: Jul. 13, 2004

(54) TRANSMITTING APPARATUS AND METHOD, RECEIVING APPARATUS AND METHOD

(75) Inventors: Naofumi Yanagihara, Tokyo (JP); Mari Horiguchi, Kanagawa (JP); Makoto Sato, Tokyo (JP); Ichiro Hamada, Kanagawa (JP); Takehiko Nakano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/461,248

(22) Filed: Dec. 15, 1999

Related U.S. Application Data

(63) Continuation of application No. 08/954,757, filed on Oct. 20, 1997, now Pat. No. 6,172,989.

(30) Foreign Application Priority Data

Oct. 22, 1996 (JP) .............................................. 8-279273
May 30, 1997 (JP) .............................................. 9-141426

(51) Int. Cl.[7] ................................................. H04J 3/24
(52) U.S. Cl. ................................................... 370/473
(58) Field of Search .......................... 370/473, 395.64, 370/352, 353, 354, 355, 466, 471, 472, 474, 475, 476; 380/217; 348/423.1, 461, 467, 469, 474, 558

(56) References Cited

U.S. PATENT DOCUMENTS 5,933,430 A  *  8/1999  Osakabe et al. ............. 370/463
5,973,748 A  * 10/1999  Horiguchi et al. .......... 348/554
5,987,126 A  * 11/1999  Okuyama et al. ........... 380/203

* cited by examiner

*Primary Examiner*—Chi Pham
*Assistant Examiner*—Alexander O. Boakye
(74) *Attorney, Agent, or Firm*—Frommer Lawrence & Haug LLP; William S. Frommer

(57) ABSTRACT

A transmitting apparatus and method, and a receiving apparatus and method for communicating a pack of 2,048 bytes using the digital interface in accordance with the IEEE 1394 standard. A 4-byte time stamp is added to a 2,048-byte pack of MPEG (Moving Picture Experts Group)—PS (program stream) data. Also, 124 bytes of padding data is added to this pack in order that the overall byte length of data be a multiple of 16. Then the data is divided into a number of fractions which is a multiple of 2 (e.g., 32), thereby being converted into a number of data blocks equal to the number of fractions. Each data block has a byte length of a multiple of 4 (e.g., 68 bytes). A CIP header and the like are added to a predetermined number of the data blocks to form a packet.

92 Claims, 24 Drawing Sheets

FIG. 5

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| | SID | | | | FMT | | | | DBS | | | | | | | | FN | | QPC | | | SPH | RSV | | DBC | | | | | | | |
| | 0 | 0 | | 1 | 0 | 0 | 1 | 0 | 0 | 0 | 0 | 1 | 0 | 0 | 0 | 1 | 0 | 0 | 0 | 0 | 0 | 1 | | | | | | | | | |
| | | | | | | | | | RSV | newFN | | | | | | | newQPC | | | | | | | FDF | | | | | | | | |
| | | | | | | | | | | 1 | 0 | 1 | 0 | 0 | 0 | 1 | 0 | 0 | 1 | 1 | 1 | | | | | | | | | | |

FIXED AT ZERO (NOT USED): bits 17–22

ONE QUADLET

FIG. 6

| FMT (BINARY) | DESCRIPTION |
|---|---|
| 0 0 0 0 0 0 | DVCR |
| 0 0 0 0 0 1 ⋮ 0 1 1 1 0 1 | RESERVED |
| 0 1 1 1 1 0 | FREE (VENDOR UNIQUE) |
| 0 1 1 1 1 1 | RESERVED |
| 1 0 0 0 0 0 | MPEG-TS |
| 1 0 0 0 0 1 | (DSS) |
| 1 0 0 0 1 0 ⋮ 1 0 0 0 1 1 | RESERVED |
| 1 0 0 1 0 0 | MPEG-PS |
| 1 0 0 1 0 1 ⋮ 1 1 1 1 0 1 | RESERVED |
| 1 1 1 1 1 0 | FREE (VENDOR UNIQUE) |
| 1 1 1 1 1 1 | NO DATA |

FIG. 8

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|
| | SID | | | | | | | DBS | | | | | | | | FN | | QPC | | | SPH | RSV | | DBC | | | | | | | |
| 0 | 0 | | | | | | | 0 | 1 | 0 | 0 | 0 | 0 | 0 | 1 | 1 | 1 | 1 | 1 | 1 | 1 | | | | | | | | | | |
| | FMT | | | | | | | FDF | | | | | | | | | | | | | | | | | | | | | | | |
| 1 | 0 | 1 | 0 | 0 | 1 | 0 | 0 | | | | | | | | | | | | | | | | | | | | | | | | |

← ONE QUADLET →

FIG. 9

| No. of DBs per packet / No. of fractions | 1 | 2 | 3 | 4 | 5 | 6 | 7 | 8 | 16 | 32 | 64 |
|---|---|---|---|---|---|---|---|---|---|---|---|
| ⟪64 fractions⟫ Padding: 252 bytes DVD net: 32 bytes IDB size: 36 bytes | Transmission rate 2.0 Mbps Band 704 units | Transmission rate 4.1 Mbps Band 848 units | Transmission rate 6.1 Mbps Band 992 units | Transmission rate 8.2 Mbps Band 1136 units | Transmission rate 10.2 Mbps Band 1280 units | Transmission rate 12.3 Mbps Band 1424 units | Transmission rate 14.3 Mbps Band 1568 units | Transmission rate 16.4 Mbps Band 1712 units | Transmission rate 32.8 Mbps Band 2864 units | Transmission rate 65.5 Mbps Band 5168 units | Transmission rate 131.1 Mbps Band 9776 units |
| ⟪32 fractions⟫ Padding: 124 bytes DVD net: 64 bytes IDB size: 68 bytes | Transmission rate 4.1 Mbps Band 832 units | Transmission rate 8.2 Mbps Band 1104 units | Transmission rate 12.3 Mbps Band 1376 units | Transmission rate 16.4 Mbps Band 1648 units | Transmission rate 20.5 Mbps Band 1920 units | Transmission rate 24.6 Mbps Band 2192 units | Transmission rate 28.7 Mbps Band 2464 units | Transmission rate 32.8 Mbps Band 2736 units | Transmission rate 65.5 Mbps Band 4912 units | Transmission rate 131.1 Mbps Band 9264 units | |
| ⟪16 fractions⟫ Padding: 60 bytes DVD net: 128 bytes IDB size: 132 bytes | Transmission rate 8.2 Mbps Band 1088 units | Transmission rate 16.4 Mbps Band 1616 units | Transmission rate 24.6 Mbps Band 2144 units | Transmission rate 32.8 Mbps Band 2672 units | Transmission rate 40.9 Mbps Band 3200 units | Transmission rate 49.2 Mbps Band 3728 units | Transmission rate 57.3 Mbps Band 4256 units | Transmission rate 65.5 Mbps Band 4784 units | Transmission rate 131.1 Mbps Band 9008 units | | |
| ⟪8 fractions⟫ Padding: 28 bytes DVD net: 256 bytes IDB size: 260 bytes | Transmission rate 16.4 Mbps Band 1600 units | Transmission rate 32.8 Mbps Band 2640 units | Transmission rate 49.2 Mbps Band 3680 units | Transmission rate 65.5 Mbps Band 4720 units | Transmission rate 81.9 Mbps Band 5760 units | Transmission rate 98.3 Mbps Band 6800 units | Transmission rate 114.7 Mbps Band 7840 units | Transmission rate 131.1 Mbps Band 8880 units | | | |

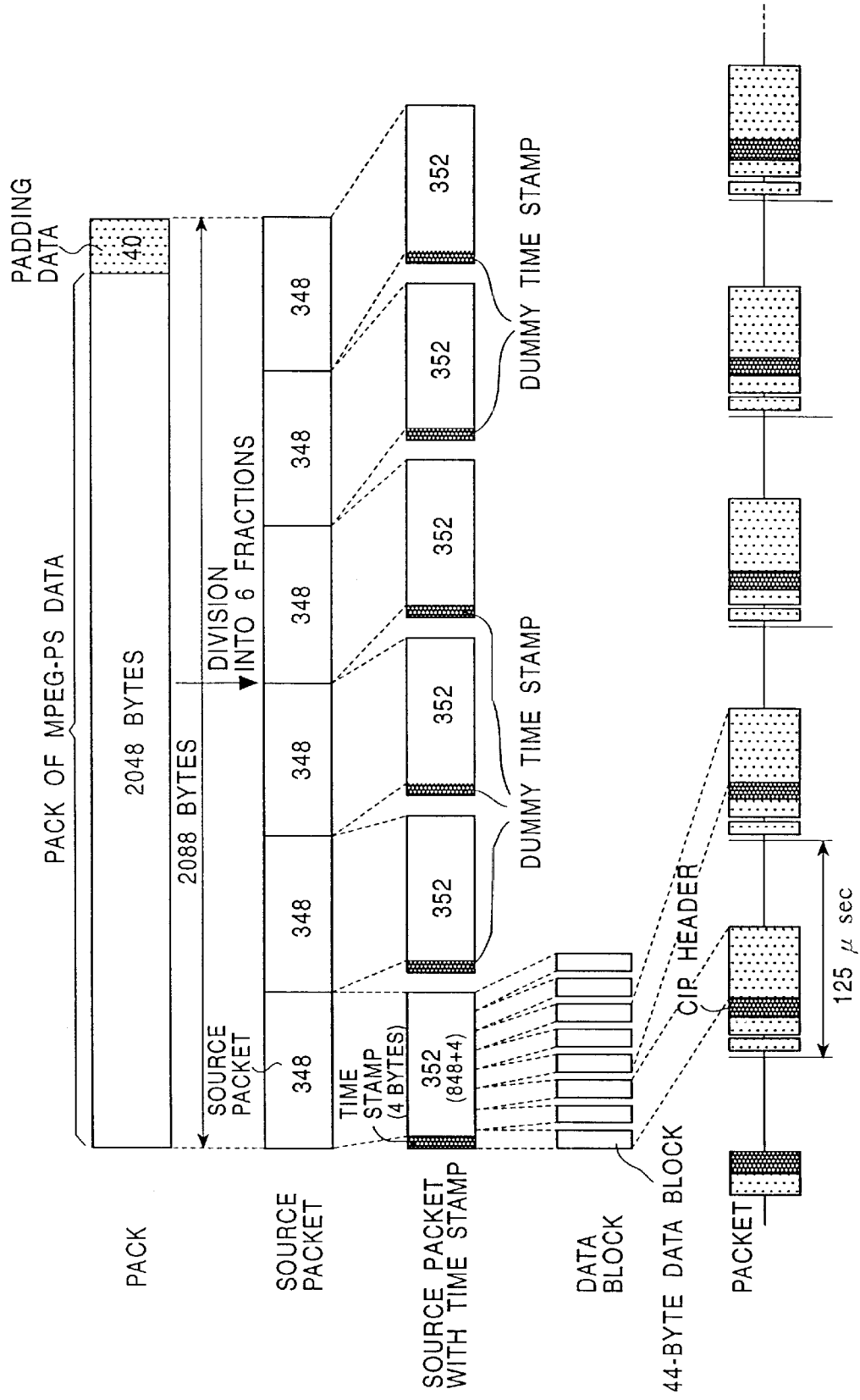

FIG. 11

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| | 0 | 0 | SID | | | | | | DBS | | | | | | | FN | | QPC | | | SPH | RSV | | DBC | | | | | | | |
| | | 0 | | | | | 0 | 0 | 0 | 0 | 0 | 1 | 0 | 1 | 1 | 1 | 1 | 0 | 0 | 0 | 1 | | | | | | | | | | |
| | 0 | | FMT | | | | | RSV | RSV | | | | | | | newQPC | | | | | | FDF | | | | | | | | | |
| | | 1 | 1 | 0 | 0 | 1 | 0 | 0 | | | | 0 | 0 | 0 | 1 | 0 | 1 | 0 | 0 | 1 | 0 | | | | | | | | | | |

ONE QUADLET

FIG. 12

| No. of DBs per packet / No. of fractions | 1 | 2 | 4 | 8 | 16 | 32 | 64 |
|---|---|---|---|---|---|---|---|
| ⟨6 × 8 fractions⟩ Padding : 40 bytes DVD net: 42.66 bytes IDB size : 44 bytes | Transmission rate 2.7 Mbps Band 736 units | Transmission rate 5.5 Mbps Band 912 units | Transmission rate 11.0 Mbps Band 1264 units | Transmission rate 22.0 Mbps Band 1968 units | Transmission rate 44.0 Mbps Band 3376 units | Transmission rate 88.1 Mbps Band 6192 units | Transmission rate 176.1 Mbps Band 11824 units |

FIG. 14

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| | 0 | 0 | SID | | | | | | DBS | | | | | | | FN | | QPC | | | SPH | RSV | | DBC | | | | | | | |
| | 1 | 0 | FIM | | | | | | RSV | new DBS | | | FDF RSV | | | | | | | | | | | SYT | | | | | | | | |
| | 1 | 0 | 1 | 0 | 0 | 1 | 0 | 0 | 0 | 1 | 1 | 0 | 1 | 1 | 0 | 0 | 0 | 0 | 0 | 0 | 0 | 0 | | | | | | | | | | |

ONE QUADLET

FIG. 15

| No. of DBs per packet<br>No. of fractions | 1 | 2 | 3 | 4 | 5 | 6 | 7 | 8 |
|---|---|---|---|---|---|---|---|---|
| ⟨64 fractions⟩<br>Padding : 0 byte<br>DVD net: 32 bytes<br>IDB size : 32 bytes | Transmission rate 2.1 Mbps<br>Band 688 units | Transmission rate 4.1 Mbps<br>Band 816 units | Transmission rate 6.1 Mbps<br>Band 944 units | Transmission rate 8.2 Mbps<br>Band 1072 units | Transmission rate 10.2 Mbps<br>Band 1200 units | Transmission rate 12.3 Mbps<br>Band 1328 units | Transmission rate 14.3 Mbps<br>Band 1456 units | Transmission rate 16.4 Mbps<br>Band 1584 units |

FIG. 19

| ITEM | CONTENT | VALUE | NOTE |
|------|---------|-------|------|
| SID | ACCORDING TO CONFIGURATION | XXXXXX | Source node ID |
| DBS | 9 QUADLETS (36B) | 00001001 | Data Block Size in quadlets |
| FN | DIVISION INTO 8 FRACTIONS | 11 | Fraction Number |
| QPC | 7 QUADLETS (28B) | 111 | Quadlet Padding Count |
| SPH | EXISTING | 1 | Source Packet Header |
| DBC | 0 ~ 225 | 0-0xFF | Data Block Counter |
| FMT | MPEG2-PS | 100001 | For MaT |
| FDF | AS DESIRED | UNDETERMINED | Format Dependent Field |

FIG. 23

| SID | DBS | FN | QPC | SPH | RSV | DBC |
|---|---|---|---|---|---|---|
| FMT | FDF | | | SYT | | |
| 0 | 0 | | | | | |
| 0 | 1 | | | | | |

FIG. 24

| FMT (BINARY) | DESCRIPTION |
|---|---|
| 000000 | DVCR |
| 000001 ⋮ 011101 | RESERVED |
| 011110 | FREE (vendor unique) |
| 011111 | RESERVED |
| 100000 | MPEG |
| 100001 | (DSS) |
| 100010 ⋮ 111101 | RESERVED |
| 111110 | FREE (vendor unique) |
| 111111 | NO DATA |

FIG. 25

| SYT (BINARY) | DESCRIPTION |
|---|---|
| X X X X 0 0 0 0 0 0 0 0 0 0 0 0 ⋮ X X X X 1 0 1 1 1 1 1 1 1 1 1 1 | TIME STAMP |
| X X X X 1 1 0 0 0 0 0 0 0 0 0 0 ⋮ X X X X 1 1 1 1 1 1 1 1 1 1 1 0 | RESERVED |
| 0 0 0 0 1 1 1 1 1 1 1 1 1 1 1 1 ⋮ 1 1 1 0 1 1 1 1 1 1 1 1 1 1 1 1 | RESERVED |
| 1 1 1 1 1 1 1 1 1 1 1 1 1 1 1 1 | NO INFORMATION |

FIG. 26

| | | | | | | | |
|---|---|---|---|---|---|---|---|
| 0 | SID | DBS | FN | QPC | SPH | RSV | DBC |
| 0 | 1 | FMT | | FDF | | | |

TRANSMITTING APPARATUS AND METHOD, RECEIVING APPARATUS AND METHOD

This is a Continuation of Application Ser. No. 08/954757 filed Oct. 20, 1997, now U.S. Pat. No. 6,172,989.

BACKGROUND OF THE INVENTION

1. Field of the Invention

The present invention relates to a transmitting apparatus and method, and a receiving apparatus and method, and, more particularly, to a transmitting apparatus and method and a receiving apparatus and method for transmitting or receiving a pack of 2,048 bytes through the digital interface in accordance with the IEEE 1394 standard.

2. Description of the Related Art

The DVD (digital versatile disc)-Video (hereinafter referred to simply as DVD) has recently been standardized. It is expected to be used widely. In the DVD, video data is recorded by being compressed in the MPEG (Moving Picture Experts Group)—PS (program stream) form. A DVD player reproduces, in its drive section, data from the DVD, and decodes, in its decoding section, the data in the MPEG program stream form reproduced from the DVD. The DVD player outputs the decoded data to a television receiver or the like to display images corresponding to the data.

It is possible that a television receiver having, for example, a function of decoding MPEG-PS-encoded data will be developed. In such a case, it is conceivable that a DVD player and a television receiver having such a decoding function are connected to each other through an AV bus, and a bit stream in an encoded state is output from the DVD player and is supplied via the AV bus to the television receiver having the decoding function to be decoded on the television receiver side.

A system has been conceived in which a DVD player and a television receiver are connected through an AV bus as described above, and in which an interface in accordance with the IEEE (The Institute of Electrical and Electronic Engineers) 1394 High Performance Serial Bus standard is used to perform data communication.

FIG. 20 shows an example of the relationship between original data and actually transmitted packets in isochronous communication in accordance with the IEEE 1394 standard.

As shown in FIG. 20, a 4-byte source packet header and padding data for controlling the data length are added to each of source packets, which are original data, and each packet is thereafter divided into a predetermined number of data blocks. The unit of data in each transmitted packet is one quadlet (=four bytes). Therefore, the byte length of each of data blocks, various headers and so on is set to a multiple of 4.

FIG. 21 shows the format of the source packet header. As 25 bits in the header, a time stamp which is used to suppress jitter, for example, when MPEG-TS (transport stream) data used in digital satellite broadcasting or the like is transmitted in isochronous communication is written.

Such a packet header, a common isochronous packet (CIP) header (described below) and any other sort of data are added to a predetermined number of data blocks, thus forming a packet.

FIG. 22 shows the structure of a packet for isochronous communication. An isochronous communication packet is formed of a packet header, a header cyclic redundancy check (header CRC), a data field and a data cyclic redundancy check (data CRC).

The packet header is formed of "Data_Length" representing the data length, "Tag" representing the kind of format of the corresponding packet (presence/absence of a CIP header or the like), "Channel" representing the number of a channel in which the packet is transmitted (one of 0 to 63), "tcode" representing a code for processing, and a sync code Sy prescribed according to each of applications. The header CRC (Header_CRC) is a packet header error detection code, and the data CRC (Data_CRC) is a data field (Data field) error detection code. The data field is formed of a CIP header and real time data. Real time data in the data field is essential data to be transmitted (the above-mentioned data blocks).

Figure 23:
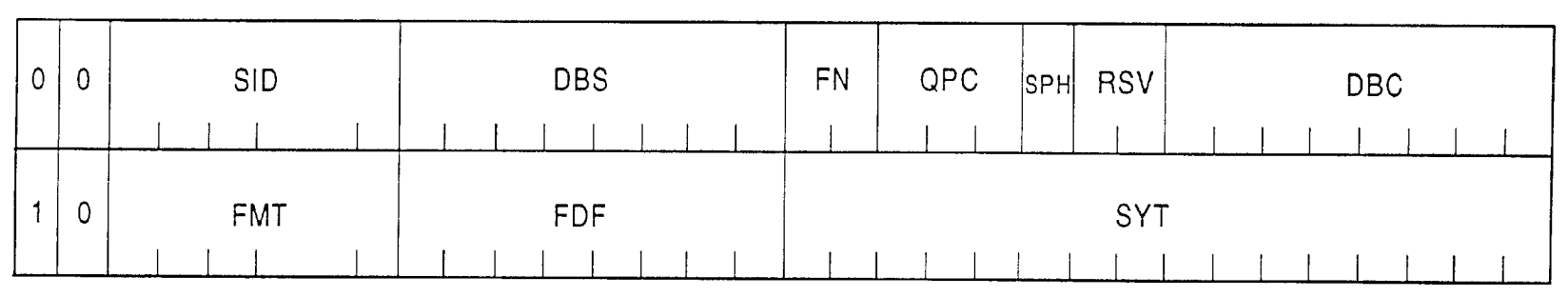

FIG. 23 shows the format of a CIP header having an SYT area provided for synchronization of frames of a video signal. This CIP header is formed of an SID (source node ID) area for a transmission node number, a DBS (data block size) area for the length of a data block, an FN (fraction number) area for the number of fractions into which data is divided to form a packet, a QPC (quadlet padding count) area for the number of quadlets of padding data, an SPH area for a flag indicating the presence/absence of a source packet header, a DBC (data block counter) area for detecting a lacuna in the packet, an FMT area for a signal format representing the sort of transmitted data, a FDF (format dependent field) area used according to the signal format, and an SYT (sync time) area.

An area rev is provided as a reserved area.

Such a CIP header having an SYT area is used, for example, when data of a digital camera-recorder is transmitted.

FIG. 24 shows the relationship between the value in the FMT area and sorts of data. For example, if DVCR (digital video cassette recorder) data is transmitted, the value in the FMT area is set to 000000 (binary). If MPEG data (MPEG-TS data) is transmitted, the value in the FMT area is set to 100000 (binary).

FIG. 25 shows the format of the SYT area. As shown in FIG. 25, lower 12 bits in 16 bits in the SYT area represent a time stamp.

FIG. 26 shows the format of a CIP header having no SYT area. In this CIP header, the SYT area in the CIP header shown in FIG. 23 is used as an FDF area.

As described above, packets for isochronous communication are formed in accordance with formats corresponding to various sorts of data to be transmitted. For example, MPEG-TS data can also be transmitted in isochronous communication as well as DVCR data transmitted in isochronous communication as described in Japanese Patent Laid-Open No. 350649/1994.

However, communication of MPEG-PS data has not been performed by using the digital interface in accordance with the IEEE 1394 standard; it is difficult to perform communication of MPEG-PS data by using the digital interface in accordance with the IEEE 1394 standard.

That is, in MPEG-PS data, the pack forming a unit of data has a length of 2,048 bytes, which is much longer than that of the pack of MPG-TS data (188 bytes). Correspondingly, the number of fractions into which data is divided to form a packet is large. However, since only two bits are assigned to the FN area of the CIP header in which the number of fractions is written, the number of fractions is limited to 1 $(=2^0)$, 2 $(=2^1)$, 4 $(=2^2)$, and 8 $(=2^3)$, and it is difficult to increase the number of fractions above 8.

The above-mentioned padding data for MPEG-PS data is usually longer than, for example, that for MPEG-TS data, but only three bits are assigned to the QPC area of the above-described CIP header. Therefore, it is difficult to use padding data equal to or larger than 8 quadlets.

SUMMARY OF THE INVENTION

In view of the above-described circumstances, an object of the present invention is to provide a transmitting apparatus and method, and a receiving apparatus and method for performing communication of a pack of 2,048 bytes using the digital interface in accordance with the IEEE 1394 standard in such a manner that the pack of 2,048 bytes is converted into a packet transmitted in isochronous communication in accordance with the IEEE 1394 standard.

To achieve this object, according to a first aspect of the present invention, there is provided a transmitting apparatus comprising conversion means for converting a pack of 2,048 bytes in data into at least one packet to be transmitted in isochronous communication in accordance with the IEEE 1394 standard, and transmitting means for transmitting the packet.

According to a second aspect of the present invention, there is provided a transmitting method comprising the steps of converting a pack of 2,048 bytes in data into at least one packet to be transmitted in isochronous communication in accordance with the IEEE 1394 standard, and transmitting the packet.

According to a third aspect of the present invention, there is provided a receiving apparatus comprising receiving means for receiving packets transmitted in isochronous communication in accordance with the IEEE 1394 standard, and restoration means for restoring a pack of 2,048 byte from at least one of the packets received by the receiving means.

According to a fourth aspect of the present invention, there is provided a receiving method comprising the steps of receiving packets transmitted in isochronous communication in accordance with the IEEE 1394 standard, and restoring a pack of 2,048 byte from at least one of the received packets.

In the transmitting apparatus in the first aspect of the present invention, the conversion means converts a pack of 2,048 bytes in data into at least one packet to be transmitted in isochronous communication in accordance with the IEEE 1394 standard, and the transmitting means transmits the packet.

In the transmitting method in the second aspect of the present invention, a pack of 2,048 bytes in data is converted into at least one packet to be transmitted in isochronous communication in accordance with the IEEE 1394 standard, and the packet is transmitted.

In the receiving apparatus in the third aspect of the present invention, the receiving means receives packets transmitted in isochronous communication in accordance with the IEEE 1394 standard, and the restoration means restores a pack of 2,048 byte from at least one of the packets received by the receiving means.

In the receiving method in the fourth aspect of the present invention, packets transmitted in isochronous communication in accordance with the IEEE 1394 standard are received, and a pack of 2,048 byte is restored from at least one of the received packets.

BRIEF DESCRIPTION OF THE DRAWINGS

FIG. 5 is a diagram showing an example of a CIP header used in the first embodiment;

FIG. 6 is a table showing an example of the relationship between the value in the FMT area and sorts of data in the first embodiment;

FIG. 8 is a diagram showing a further example of the CIP header used in the first embodiment;

FIG. 9 is a table showing the relationship between the number of fractions, the number of data blocks per packet, and the rate and band of transmission of data in the first embodiment;

FIG. 10 is a diagram showing an example of a procedure for forming packets in a second embodiment of the present invention;

FIG. 11 is an example of a CIP header used in the second embodiment;

FIG. 12 is a table showing the relationship between the number of data blocks per packet and the rate and band of transmission of data in the second embodiment;

FIG. 14 is an example of a CIP header used in the third embodiment.

FIG. 15 is a table showing the relationship between the number of data blocks per packet and the rate and band of transmission of data in the third embodiment;

FIG. 19 is a table showing an example of a CIP header in MPEG2-PS transmission;

FIG. 23 is a diagram showing the format of a CIP header having an SYT area;

FIG. 24 is a table showing an example of the relationship between the value in the FMT area and sorts of data;

FIG. 25 is a table showing the format of the SYT area; and

FIG. 26 is a diagram showing the format of a CIP header having no SYT area.

DESCRIPTION OF THE PREFERRED EMBODIMENTS

Figure 1:
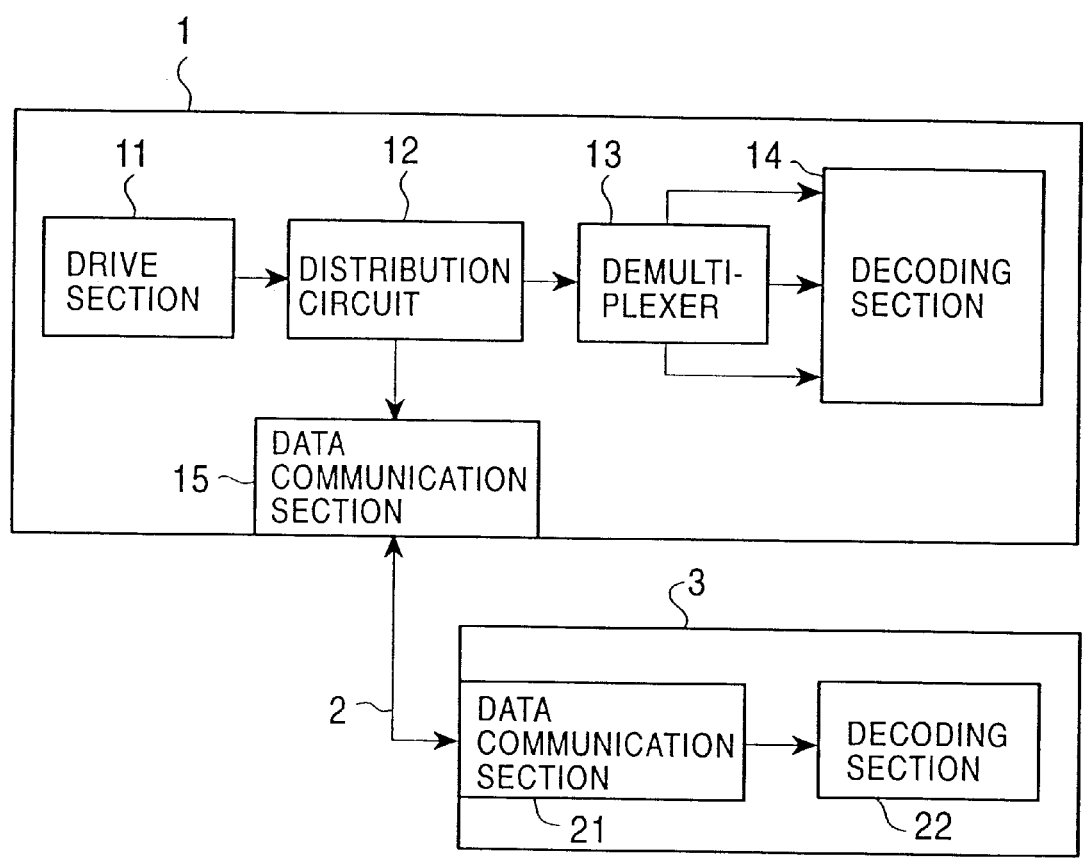
FIG. 1 is a block diagram showing the configuration of an example of an AV system for reproducing a DVD.

FIG. 1 shows the configuration of an example of an AV system for DVD playback. In a DVD player 1 of the AV system shown in FIG. 1, a drive section 11 is arranged to read out data (MPEG-PS data) recorded on a DVD (not shown) by using, for example, laser light and to output the read data to a distribution circuit 12.

The distribution circuit 12, supplied with MPEG-PS data from the drive unit 11, is arranged to output the MPEG-PS data to a demultiplexer 13 and to a data communication section 15.

The demultiplexer 13 is arranged to sort, out of supplied MPEG-PS data, a video pack having video information, an audio pack having audio information and a sub picture pack having information such as captions, and to output the packs to a decoding section 14.

The decoding section 14 incorporates decoders for decoding the video pack, the audio pack and the sub picture pack. Each decoder decodes the corresponding pack to form a video or audio signal and outputs the signal to a predetermined apparatus (not shown).

The data communication section 15 is arranged to convert packs of MPEG-PS data supplied from the distribution circuit 12 into packets for isochronous communication in accordance with the IEEE 1394 standard, and to transmit the packets to a digital television receiver (digital TV) 3 via an AV bus 2.

In the digital TV 3, a data communication section 21 is arranged to receive packets for isochronous communication in accordance with the IEEE 1394 standard transmitted from the DVD player 1 via the AV bus 2, to convert the packets into the original packs and to output the packs to a decoding section 22.

The decoding section 22 incorporates decoders for respectively decoding video, audio and sub picture packs, as does the decoding section 14 of the DVD player 1. The decoding section 22 sorts video, audio and sub picture packs out of supplied data, and each decoder decodes the corresponding pack to form a video or audio signal and outputs the signal to a predetermined circuit (not shown).

Figure 2:
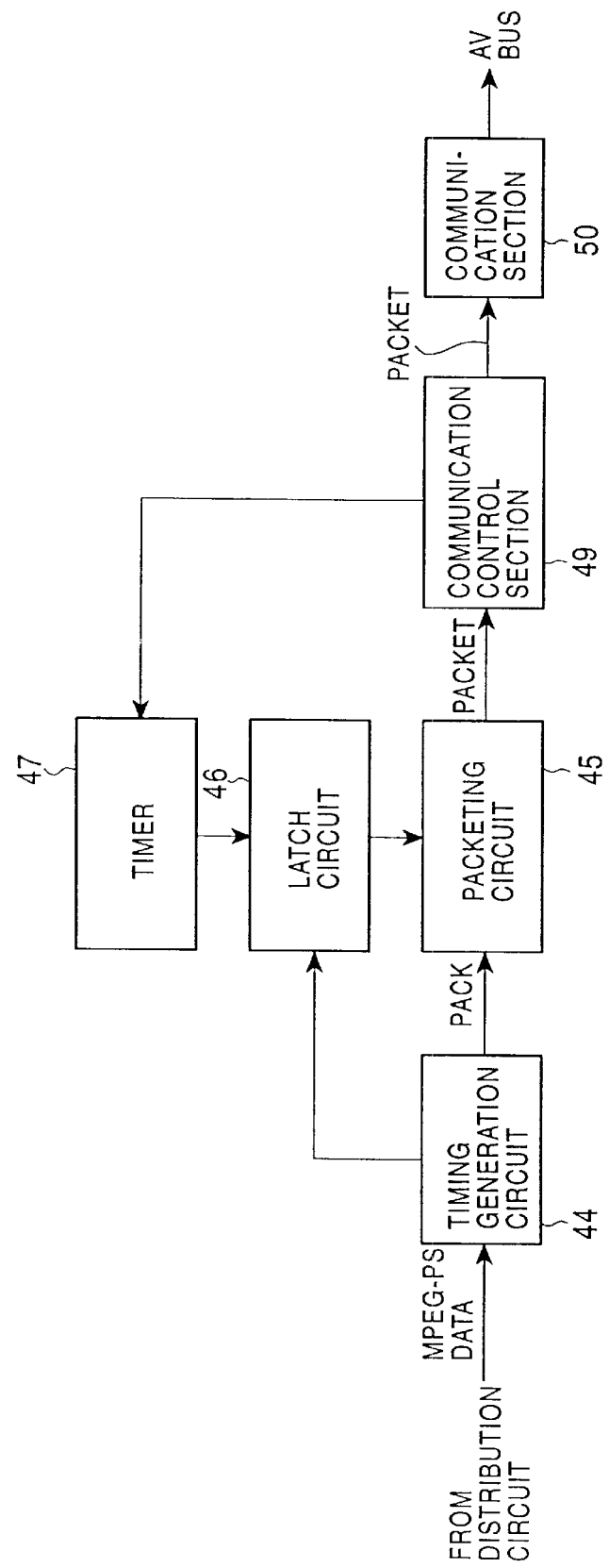
FIG. 2 is a block diagram showing the configuration of an example of a data communication section of a DVD player shown in FIG. 1, which represents a transmitting apparatus in accordance with a first embodiment of the present invention.

FIG. 2 shows the configuration of an example of the data communication section 15 of the DVD player 1, which represents a transmitting apparatus in accordance with a first embodiment of the present invention.

A timing generation circuit 44, which is supplied with MPEG-PS data from the distribution circuit 12, is arranged to output the MPEG-PS data directly to a packeting circuit 45 (conversion means) and to output a pulse signal to a latch circuit 46 when it outputs a pack of the MPEG-PS data to the packeting circuit 45.

A timer 47 is arranged to operate its internal counter for clocking and to output the value of the counter to the latch circuit 46. The timer 47 is also arranged to calibrate the value of the counter by a control signal supplied in a cycle of 125 μsec from a communication control section 49.

The latch circuit 46 is arranged to hold the value (time information) supplied from the timer 47 when a pulse signal is supplied from the timing generation circuit 44. The latch circuit 46 holds the value until the next pulse signal is supplied, and outputs the value to the packeting circuit 45.

The packeting circuit 45 is arranged to convert, in a procedure described below, a pack supplied from the timing generation circuit 44 and time information (a time stamp for suppressing jitter) supplied from the latch circuit 46 into packets for isochronous communication in accordance with IEEE 1394, and to output the packets to the communication control section 49.

This time stamp is used to suppress jitter (in transmission) and is not used for decoding of data.

The communication control section 49 is arranged to output, at the start of the period of a cycle of 125 μsec, a control signal to the timer 47 and a cycle sync signal and a cycle start packet to a communication section 50 (transmission means). One packet per cycle, supplied from the packeting circuit 45, is output from the communication control section 49 to the communication section 50.

The communication section 50 is arranged to transmit, over the AV bus 2, cycle sync signals, cycle start packets and isochronous communication packets supplied from the communication control section 49.

Figure 3:
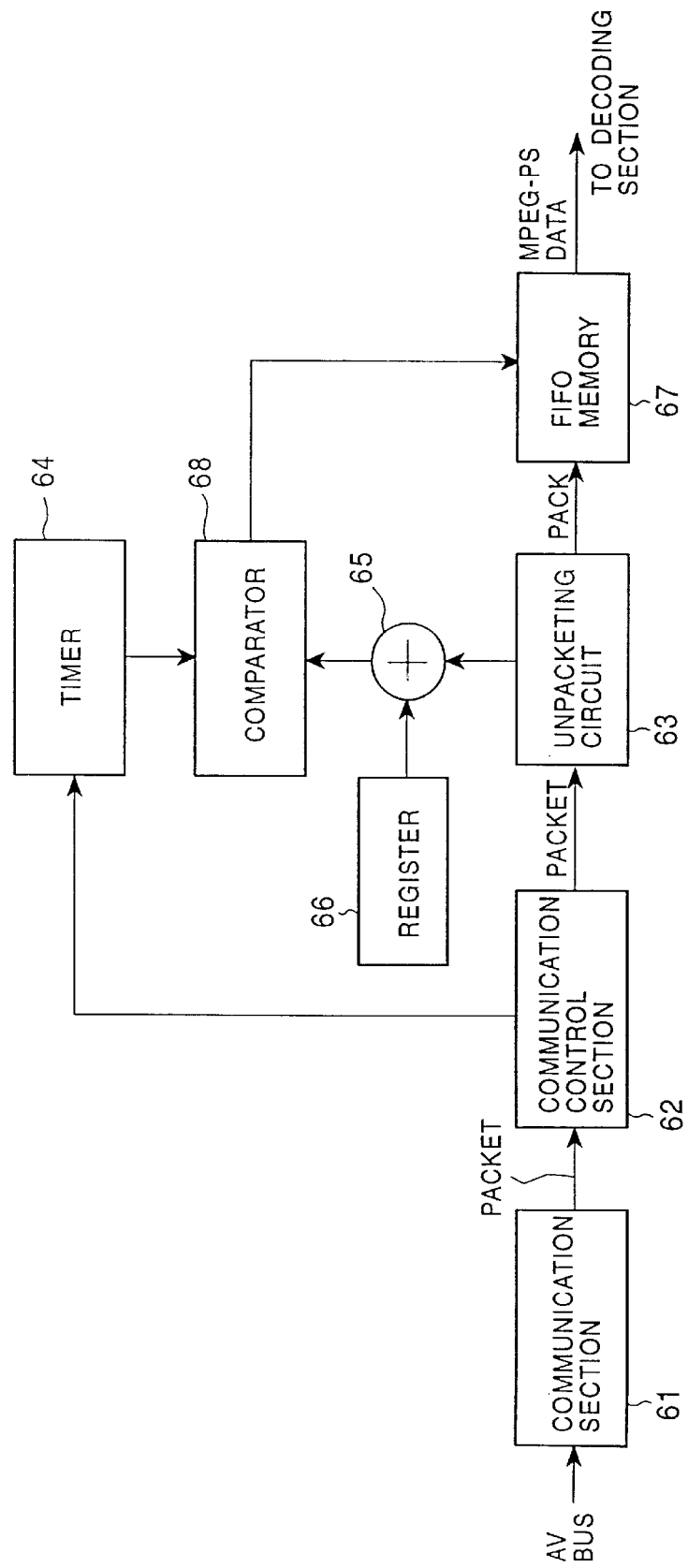
FIG. 3 is a block diagram showing the configuration of an example of a data communication section of a digital TV shown in FIG. 1, which represents a receiving apparatus in accordance with the first embodiment of the present invention.

FIG. 3 shows the configuration of an example of the data communication section 21 of the digital TV 3, which represents a receiving apparatus in accordance with the first embodiment of the present invention.

A communication section 61 (receiving means) is arranged to receive cycle sync signals, cycle start packets and isochronous communication packets transmitted via the AV bus 2, and outputs the signals and the packets to a communication control section 62.

The communication control section 62 is arranged to output a control signal according to a cycle sync signal to a timer 64 when supplied with the cycle sync signal, and to output a supplied isochronous communication packet to an unpacketing circuit 63 (restoration means).

The unpacketing circuit 63 is arranged to restore a pack of MPEG-PS data from a predetermined number of packets, as described below, and to output the restored pack to a FIFO memory 67. Also, the unpacketing circuit 63 is arranged to extract time information (time stamps) converted into packets together with the pack in the data communication section 15 of the DVD player 1, and to output the time information to an adder 65.

The adder 65 is arranged to calculate the sum of a delay time previously set in a register 65 and time information supplied from the unpacketing circuit 63, and to output the result of this calculation to a comparator 68.

The timer 64 is arranged to operate its internal counter for clocking and to output the value of the counter to the comparator 68. The timer 64 is also arranged to calibrate the value of the counter by a control signal supplied from the communication control section 62.

The comparator 68 is arranged to output a pulse signal to the FIFO memory 67 when a match occurs between the time clocked by the timer 64 and the time information supplied from the adder 65 (the time stamp of a pack+the delay time).

The FIFO memory 67 is arranged to output, to a decoding section 22, data (pack) supplied from the unpacketing circuit 63 when a pulse signal is supplied from the comparator 68. The FIFO memory 67 outputs the data in FIFO (first in first out) order, i.e., in order of input.

The operations of the above-described DVD player 1 (first embodiment) and digital TV 3 (first embodiment) will next be described.

First, the drive section 11 of the DVD player 1 reads out MPEG-PS data from a DVD, and outputs the data to the distribution circuit 12.

The distribution circuit 12 outputs the data to the demultiplexer 13 and to the timing generation circuit 44 of the data communication section 15.

The timing generation circuit 44 of the data communication section 15 outputs a pack of MPEG-PS data to the packeting circuit 45 and outputs a pulse signal to the latch circuit 46. The latch circuit 46 holds the time at which it receives the signal, and outputs the corresponding time information to the packeting circuit 45.

Figure 4:
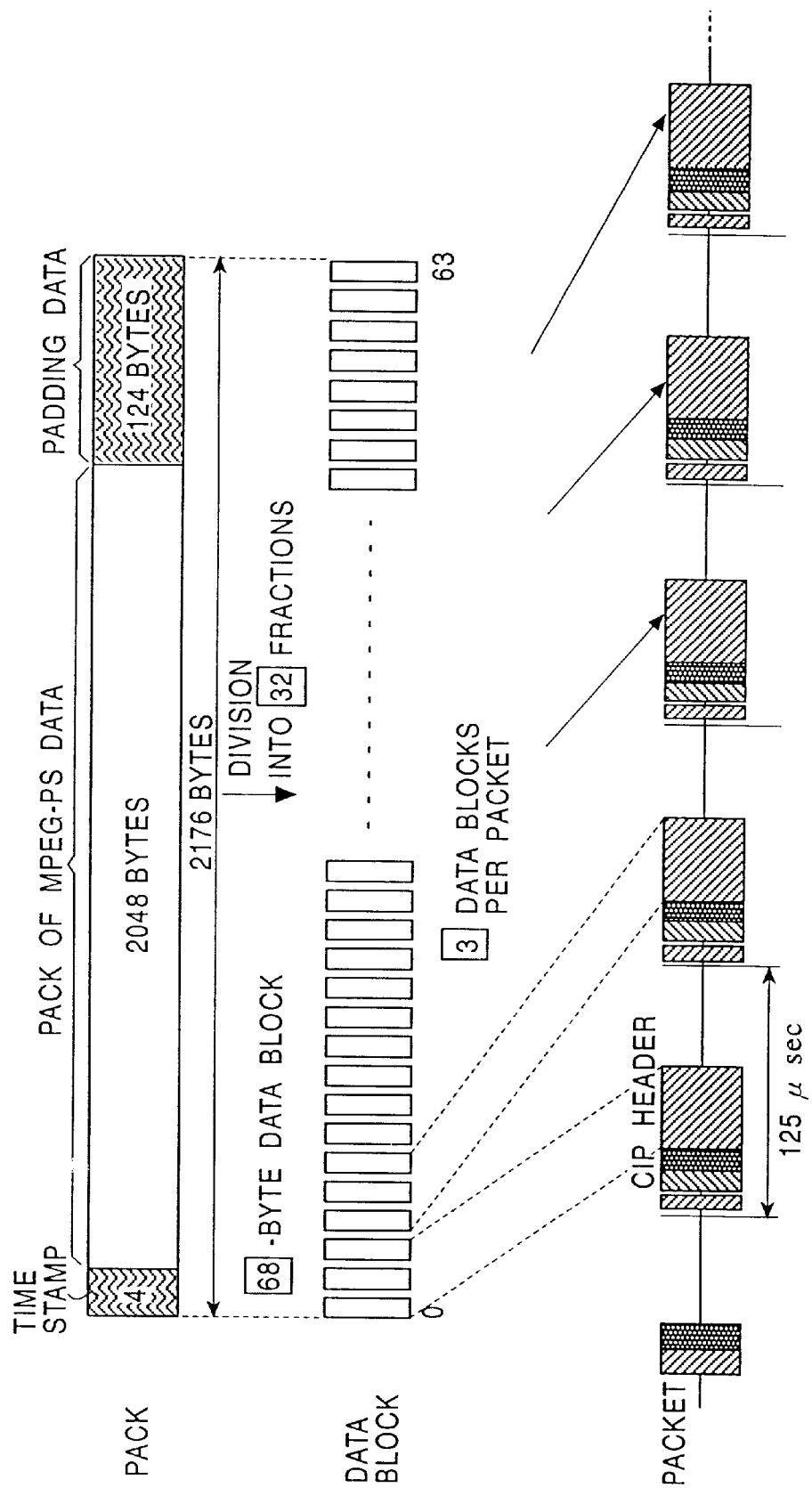
FIG. 4 is a diagram showing an example of a procedure for forming packets in the first embodiment.

Next, the packeting circuit 45 sets the supplied time information as a 4-byte time stamp and adds 124-byte padding data to the time stamp and the 2,048 byte pack in order that the total byte length be a multiple of 16, as shown in FIG. 4. As padding data, no particular information is held since padding data is added for the purpose of adjusting the total data length.

For example, a shown in FIG. 4, the packeting circuit 45 divides the time stamp, pack and padding data into a number of fractions which is a multiple of 2 (32 in this case) to convert them into the same number of data blocks having a byte length which is a multiple of 4 (64 bytes in this case). That is, data of a total length of 2176 (=4+2048+124) bytes is divided into 32 data blocks of 68 bytes.

Next, the packeting circuit 45 forms a CIP header and forms a packet containing the CIP header and a predetermined number of data blocks.

FIG. 5 shows an example of a CIP header format used in the first embodiment.

In this embodiment, the relationship between the value in the FMT area of the CIP header and sorts of data is set as shown in FIG. 6. That is, in the case of transmission of MPEG-PS data in this embodiment, the value in the FMT area is set to 100100 (binary), different from that for MPEG-TS.

Also in this CIP header, in the case of transmission of MPEG-PS data (i.e., in the case where the value in the FMT area is 100100 (binary)), the values in the original (FIG. 26) FN area and QPC area (the 17th to 21st bits of the No. 0 quadlet) are fixed at 0. Also, the three, 2nd to 4th bits in the FDF area (shown as new FN) are used as a new FN area while the eight, 5th to 12th bits in the FDF area (shown as new QPC) are used as a new QPC area.

The value in the FN area (new FN) is set to the logarithm of the number of fractions FN to base 2 ($\log_2 FN$).

Thus, a pack can be converted into a packet by increasing the number of bits assigned to the FN and QPC areas even if the number of fractions is large or the length of padding data is long as in the case of processing a pack of MPEG-PS data.

In the CIP header shown in FIG. 5, the value in the DBS area is 00010001 (binary), the value in the FN area (new FN) is 101 (binary) and the value in the QPC area (new QPC) is 00011111 (binary). Therefore, the length of each data block is 17 quadlets, i.e., 68 bytes, the number of fractions into which a pack is divided is 32 ($=2^5$), and the length of padding data is 31 quadlets, i.e., 124 bytes.

Figure 7:
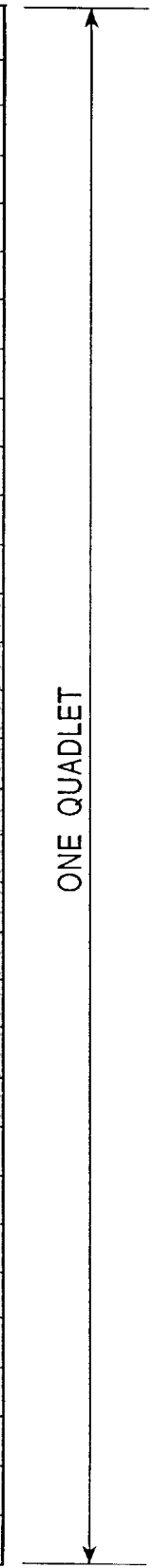
FIG. 7 is a diagram showing another example of the CIP header used in the first embodiment.

A CIP header such as shown in FIG. 7 may also be formed to use both the original FN area and the new FN area (shown as sub FN). In such a case, if the value in the original FN area is $n_{FN1}$ and the value in the new FN area (sub FN) is $n_{FN2}$, the number of fractions is the ($n_{FN1}$+ is $n_{FN2}$)th power of 2.

Figure 26:
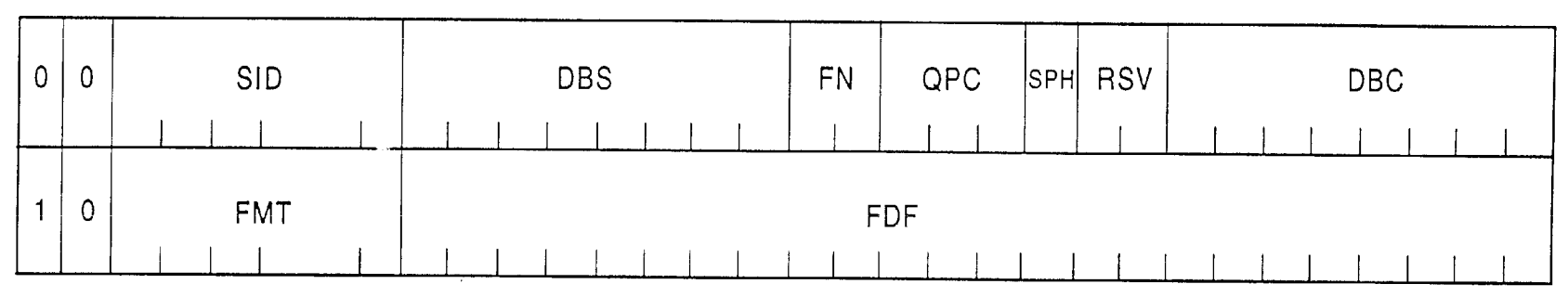

Further, as shown in FIG. 8, the same format as that of the CIP header shown in FIG. 26 may be used. In such a case, however, the number of fractions is limited to 8 ($=2^3$) or less and the length of padding data is limited to 7 quadlets or less. Therefore, the data transmission rate is 16.4 Mbps ($16.4 \times 10^6$ bits/sec) or higher.

FIG. 9 shows the rate and band of transmission of DVD data (i.e., MPEG-PS data) in the case where the number of fractions is one of 8, 16, 32, and 64 and where the number of data blocks per packet is one of 1 to 8, 16, 32, and 64. If the number of data blocks per packet is a power of 2, processing in the packeting circuit 45 is simplified.

If the number of fractions is FN and if the number of data blocks per packet is DB, the amount of MPEG-PS data (average) contained in one packet is (2048/FN)×DB bytes (=16384/FN)×DB bits), and packets are distributed each in a cycle of 125 µsec. As a result, the rate of transmission of MPEG-PS data is (131.1/FN)×DB (={2048×8/125}/FN)× DB) Mbps.

Since the DVD playback rate in accordance with the standard is 2.52 Mbps, 5.04 Mbps, or 10.08 Mbps, the number of fractions FN and the number of data blocks DB per packet are set so as to satisfy one of the following equations:

$$(131.1/FN) \times DB \geq 10.08$$
$$(131.1/FN) \times DB \geq 5.04$$
$$(131.1/FN) \times DB \geq 2.52$$

That is, if the playback rate is changed, FN and DB are changed in accordance with the above equations.

Accordingly, in the case where the playback rate is set to 10.08 Mbps and where division into 64 fractions is made, the number of data blocks per packet is set to 5 or greater. If division into 32 fractions is made, the number of data blocks per packet is set to 3 or greater. If division into 16 fractions is made, the number of data blocks per packet is set to 2 or greater.

That is, in forming one packet, the packeting circuit 45 uses data blocks corresponding to the number of data blocks set as described above.

The band of communication in accordance with the IEEE 1394 standard is calculated as shown by the following equation:

$$\text{Band} = \text{Overhead\_ID} \times C + (\text{Payload} + K) \times DR$$

Overhead_ID is 15 (default value), C is fixed at 32 units and K is fixed at 3. Also, Payload is the number of quadlets of transmitted data (data blocks and CIP headers), and DR is a value which is set according to a performance of communication. In the case of 100 M transmission, DR is set to 16. In the case of 200 M transmission, DR is set to 8. In the case of 400 M transmission, DR is set to 4. In FIG. 9, the band is calculated by setting DR to 16.

For example, referring to FIG. 9, if the number of fractions is 64 and if the number of data blocks per packet is 1, the band used is 704 (=15×32+(11+3)×16) units.

Packets formed in the above-described manner are supplied to the communication control section 49.

The communication control section 49 outputs a control signal to the timer 47 in every 125 µsec cycle at the start of the cycle, simultaneously outputs a cycle sync signal and a cycle start packet to the communication section 50. Also, the communication control section 49 is supplied with packets from the packeting circuit 45 and outputs the packets to the communication section 50 one in every cycle.

The communication section 50 transmits, over the AV bus 2, cycle sync signals, start packets and isochronous communication packets supplied from the communication control section 49.

In the above-described manner, MPEG-PS data is converted into packets for isochronous communication and the packets are transmitted over the AV bus 2.

The communication section 61 of the digital TV 3 receives cycle sync signals, cycle start packets and isochronous communication packets transmitted from the DVD player 1 via the AV bus 2, and outputs the received signals and packets to the communication control section 62.

When supplied with one cycle sync signal, the communication control section 62 outputs a control signal according to the cycle sync signal to the timer 64, and outputs the corresponding supplied isochronous communication packet to the unpacketing circuit 63.

The unpacketing circuit 63 reads the CIP header of each supplied isochronous communication packet and restores the group of data formed of MPEG-PS data, a time stamp and padding data from at least one packet corresponding to FN data blocks.

The unpacketing circuit 63 removes, from the restored data, the padding data of the byte length corresponding to the value in the QPC area of the CIP header by referring to the value in the QPC area, outputs the head 4-byte time stamp to the adder 65, and outputs the pack of MPEG-PS data to the FIFO memory 67.

The adder 65 calculates the sum of the preset delay time supplied from the register 65 and time information (time stamp) supplied from the unpacketing circuit 63, and outputs the result of this calculation to the comparator 68.

The comparator 68 outputs a pulse signal to the FIFO memory 67 when a match occurs between the time clocked by the timer 64 and the time information supplied from the adder 65 (the time stamp of the pack+the delay time).

When supplied with the pulse signal from the comparator 68, the FIFO memory 67 outputs, to the decoding section 22, the data supplied from the unpacketing circuit 63. The FIFO memory 67 outputs the data in FIFO order, i.e., in order of input. Thus, the data is supplied to the decoding section 22 in synchronization with the time stamp, thereby suppressing jitter.

The decoding section 22 decodes the MPEG-PS data to form video and audio signals, and outputs the signals to predetermined circuits (not shown).

In the first embodiment, as described above, a group of data formed by adding a time stamp and padding data to an MPEG-PS data pack of 2,048 bytes is divided to form data blocks, and packets having a predetermined number of the data blocks are transmitted, thus transmitting the pack of 2,048 bytes to the digital TV 3 operating as a decoder through the digital interface in accordance with the IEEE 1394 standard.

A DVD player 1 which represents a transmitting apparatus in accordance with a second embodiment of the present invention and a digital TV 3 which represents a receiving apparatus in accordance with the second embodiment of the present invention will next be described.

The DVD player 1 of the second embodiment has the same configuration as the DVD player 1 of the first embodiment and differs from the first DVD player 1 only in the operation of the packeting circuit 45. Therefore, the configuration of the DVD player 1 of the second embodiment will not be described.

The digital TV 3 of the second embodiment has the same configuration as the digital TV 3 of the first embodiment and differs from the first digital TV 3 only in the operation of the unpacketing circuit 63. Therefore, the configuration of the digital TV 3 of the second embodiment will not be described.

The operations of the second embodiment DVD player 1 and digital TV 3 will now be described. The following description refers only to the operations of the packeting circuit 45 and the unpacketing circuit 63 because the operations of the sections other than the packeting circuit 45 and the unpacketing circuit 63 are the same as those in the first embodiments.

The packeting circuit 45 of the second embodiment first adds padding data to a pack of 2,048 bytes, as shown in FIG. 10. The length of padding data is set to such a value that the byte length of one source packet formed by dividing the data formed of the pack of 2,048 bytes and padding data into a first number of fractions $FN_1$ is equal to a value obtained by subtracting the byte length of a time stamp (=4) from a multiple of 16.

That is, if the byte length of the time stamp is $L_{TS}$ ($L_{TS}$=4), the byte length LPD of padding data is calculated as shown by the following equation using a predetermined positive integer n:

$$LPD = FN_1 \times (16 \times n - L_{TS}) - 2048$$

The number n is assumed to be an integer equal to or greater than $(2048/FN_1 + L_{TS})/16$.

For example, if $L_{TS}$=4 and $FN_1$=6 as shown in FIG. 10, and if n is set to 22, the byte length $L_{PD}$ of padding data calculated is 40 (=6×(16×22−4)−2048).

Next, the packeting circuit 45 divides the data formed of the length of padding data calculated as described above, and the pack of 2,048 bytes into the first number of fractions $FN_1$, thereby forming $FN_1$ source packets having a byte length of a multiple of 16. If the byte length of each source packet is $L_{SP}$, it is calculated as shown by the following equation:

$$L_{SP} = (2048 + L_{PD})/FN_1$$

For example, if the length of padding data is 40 bytes and the first number of fractions $FN_1$ is 6, the length of each source packet is 348=(=(2048+40)/6) bytes, as shown in FIG. 10.

Then, as shown in FIG. 10, the packeting circuit 45 adds the 4-byte time stamp to the headmost end of each formed source packet, divides each source packet with the added 4-byte time stamp into a second number of fractions $FN_2$ which is a multiple of 2 ($FN_2$=8 in this case), thereby forming data blocks having a byte length of a multiple of 4 (44 bytes in this case).

The packeting circuit 45 then forms a CIP header and forms a packet containing the CIP header and a predetermined number of the data blocks.

FIG. 11 shows an example of a CIP header format used in the second embodiment.

The relationship between the value in the FMT area of the CIP header and sorts of data set in this embodiment is the same as that in the first embodiment.

In this CIP header, if MPEG-PS data is transmitted (that is, if the value in the FMT area is 100100 (binary)), the logarithm of the second number of fractions $FN_2$ to base 2 ($\log_2(FN_2)$) is written in the FN area, and the value in the original (FIG. 26) QPC area (the 19th to 21st bits of the No. 0 quadlet) is fixed at 0. The eight, 5th to 12th bits in the FDF area (shown as new QPC) are used as a new QPC area.

Since the first number of fractions $FN_1$ is fixed as a preset number, it is not transmitted through packets. Only the second number of fractions $FN_2$ is written in the header while the first number of fractions $FN_1$ is fixed. Therefore, only two bits in the FN area may suffice.

Thus, the number of bits assigned to the QPC area is increased to enable conversion of a pack into packets even if the length of padding data is large.

In the CIP header shown in FIG. 11, the value in the DBS area is 00001011 (binary), the value in the FN area is 11 (binary) and the value in the QPC area (new QPC) is 00001010 (binary). Therefore, the length of the data block is 11 quadlets, i.e., 44 bytes, the second number of fractions is 8 (=$2^3$), and the length of padding data is 10 quadlets, i.e., 40 bytes.

FIG. 12 shows the rate and band of transmission of DVD data (i.e., MPEG-PS data) in the case where the first number of fractions $FN_1$ is 6, the second number of fractions $FN_2$ is 8, and the number of data blocks per packet is one of 1 to 8, 16, 32, and 64.

If the number of data blocks per packet is DB, the amount of MPEG-PS data (average) contained in one packet is (2048/($FN_1 \times FN_2$))×DB bytes (=(16384/($FN_1 \times FN_2$))×DB bits), and packets are distributed each in a cycle of 125 μsec. As a result, the rate of transmission of MPEG-PS data is (131.1/($FN_1 \times FN_2$))×DB (Mbps).

Since the DVD playback rate is 2.52 Mbps, 5.04 Mbps, or 10.08 Mbps, the numbers of fractions $FN_1$ and $FN_2$ and the number of data blocks DB per packet are set so as to satisfy one of the following equations:

$$(131.1/(FN_1 \times FN_2)) \times DB \geq 10.08$$

$$(131.1/(FN_1 \times FN_2)) \times DB \geq 5.04$$

$$(131.1/(FN_1 \times FN_2)) \times DB \geq 2.52$$

That is, if the playback rate is changed, FN and DB are changed in accordance with the above equations.

Accordingly, in the case where the playback rate is set to 10.08 Mbps and where the first and second numbers of fractions are 6 and 8, respectively, the number of data blocks per packet is set to 4 or greater. Also in the case where the first or second number of fractions is set to some other value, the number of data blocks per packet is set to a number calculated in the same manner.

In the above-described manner, the packeting circuit 45 of the second embodiment converts an MPEG-PS data pack of 2,048 bytes into isochronous communication packets.

The operation of the unpacketing circuit 63 of the second embodiment will next be described.

The unpacketing circuit 63 reads the CIP header of each of packets supplied from the communication control section 62 and restores source packets with added time stamps each from at least one packet corresponding to $FN_2$ data blocks.

Next, the unpacketing circuit 63 outputs the head 4-byte time stamps to the adder 65, and restores one pack of MPEG-PS data with added padding data from $FN_1$ source packets.

Then, the unpacketing circuit 63 removes, from the restored data, the padding data of the byte length corresponding to the values in the QPC areas of the CIP headers by referring to the values in the QPC areas, and outputs the pack of MPEG-PS data to the FIFO memory 67.

Thus, the unpacketing circuit 63 of the second embodiment restores the MPEG-PS data pack of 2,048 bytes from isochronous communication packets.

In the second embodiment, as described above, a group of data formed by adding padding data to one MPEG-PS data pack of 2,048 bytes is divided to form source packets, groups of data formed by adding time stamps to the source packets are further divided to form data blocks, and packets each having a predetermined number of data blocks are transmitted, thus transmitting the pack of 2,048 bytes to the digital TV 3 operating as a decoder through the digital interface in accordance with the IEEE 1394 standard.

A DVD player 1 which represents a transmitting apparatus in accordance with a third embodiment of the present invention and a digital TV 3 which represents a receiving apparatus in accordance with a third embodiment of the present invention will next be described.

The DVD player 1 of the third embodiment has the same configuration as the DVD player 1 of the first embodiment and differs from the first DVD player 1 only in the operation of the packeting circuit 45. Therefore, the configuration of the DVD player 1 of the third embodiment will not be described.

The digital TV 3 of the third embodiment has the same configuration as the digital TV 3 of the first embodiment and differs from the first digital TV 3 only in the operation of the unpacketing circuit 63. Therefore, the configuration of the digital TV 3 of the third embodiment will not be described.

The operations of the third embodiment DVD player 1 and digital TV 3 will now be described. The following description refers only to the operations of the packeting circuit 45 and the unpacketing circuit 63 because the operations of the sections other than the packeting circuit 45 and the unpacketing circuit 63 are the same as those in the first embodiments.

The packeting circuit 45 in the third embodiment divides a pack of 2,048 bytes into a predetermined number of fractions which is a multiple of 2, thereby forming FN data blocks having a byte length of a multiple of 4.

Figure 13:
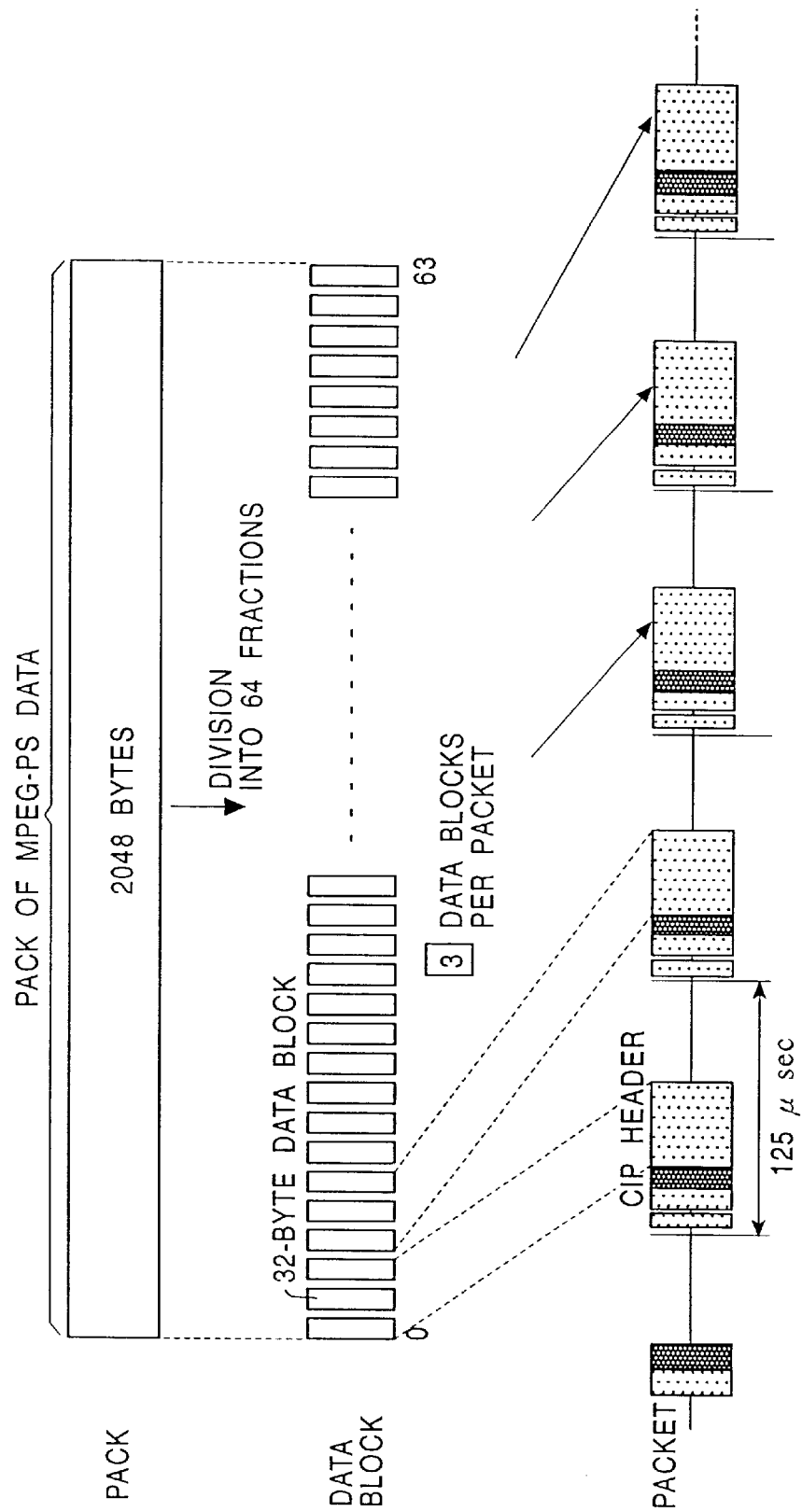
FIG. 13 is a diagram showing an example of a procedure for forming packets in a third embodiment of the present invention.

For example, if a pack of 2,048 bytes is divided into 64 fractions, 64 data blocks each consisting of 32 (=2,048/64) bytes are formed as shown in FIG. 13.

The packeting circuit 45 forms a CIP header and forms a packet containing the CIP header and a predetermined number of the data blocks.

FIG. 14 shows an example of a CIP header format used in the third embodiment.

The relationship between the value in the FMT area of the CIP header and sorts of data set in this embodiment is the same as that in the first embodiment.

In this CIP header, if MPEG-PS data is transmitted (that is, if the value in the FMT area is 100100 (binary)), the value in the original (FIG. 26) QPC area (the 17th and 18th bits of the No. 0 quadlet) is fixed at 0, and the three, 2nd to 4th bits in the FDF area (shown as new FN) are used as a new FN area.

In this embodiment, the value in the QPC area is set to 0 since no padding data is used. In this embodiment, a CIP header having an SYT area is used and a time stamp of a pack is set in the SYT area.

Thus, the number of bits assigned to the FN area is increased to enable a pack to be converted into packets even if the number of fractions is large.

In the CIP header shown in FIG. 14, the value in the DBS area is 00001000 (binary), the value in the new FN area (new FN) is 110 (binary), the length of the data block is set to 8 quadlets, i.e., 32 bytes, and the number of fractions is set to 64 (=$2^6$).

FIG. 15 shows the rate and band of transmission of DVD data (i.e., MPEG-PS data) in the case where the number of fractions is 64 and the number of data blocks per packet is one of 1 to 8.

If the number of fractions is FN and if the number of data blocks per packet is DB, the amount of MPEG-PS data contained in one packet is (2048/FN)×DB bytes (=16384/FN)×DB bits), and packets are distributed each in a cycle of 125 μsec. As a result, the rate of transmission of MPEG-PS data is calculated as (131.1/FN)×DB (Mbps).

Since the DVD playback rate is 2.52 Mbps, 5.04 Mbps, or 10.08 Mbps, the number of fractions FN and the number of data blocks DB per packet are set so as to satisfy one of the following equations:

$$(131.1/FN) \times DB \geq 10.08$$
$$(131.1/FN) \times DB \geq 5.04$$
$$(131.1/FN) \times DB \geq 2.52$$

That is, if the playback rate is changed, FN and DB are changed in accordance with the above equations.

Accordingly, in the case where the playback rate is set to 10.08 Mbps and where the number of fractions is 64, the number of data blocks per packet is set to 5 or greater. Also in the case where the number of fractions is set to some other value, the number of data blocks per packet is set to a number calculated in the same manner.

In the above-described manner, the packeting circuit 45 of the third embodiment converts an MPEG-PS data pack of 2,048 bytes into isochronous communication packets.

The operation of the unpacketing circuit 63 of the third embodiment will next be described.

The unpacketing circuit 63 reads the CIP header of each of packets supplied from the communication control section 62 and restores one pack from at least one packet corresponding to FN data blocks. Also, the unpacketing circuit 63 reads out a time stamp from the SYT area of the CIP header and outputs the read value to the adder 65.

The unpacketing circuit 63 outputs the restored pack of MPEG-PC data to the FIFO memory 67.

Thus, the unpacketing circuit 63 of the third embodiment restores the MPEG-PS data pack of 2,048 bytes from isochronous communication packets.

In the third embodiment, as described above, an MPEG-PS data pack of 2,048 bytes is divided to form data blocks, and packets each having a predetermined number of data blocks are transmitted, thus transmitting the pack of 2,048 bytes to the digital TV 3 operating as a decoder through the digital interface in accordance with the IEEE 1394 standard.

A DVD player 1 which represents a transmitting apparatus in accordance with a fourth embodiment of the present invention and a digital TV 3 which represents a receiving apparatus in accordance with the fourth embodiment of the present invention will next be described.

The DVD player 1 of the fourth embodiment has the same configuration as the DVD player 1 of the first embodiment and differs from the first DVD player 1 only in the operation of the packeting circuit 45. Therefore, the configuration of the DVD player 1 of the fourth embodiment will not be described.

The digital TV 3 of the fourth embodiment has the same configuration as the digital TV 3 of the first embodiment and differs from the first digital TV 3 only in the operation of the unpacketing circuit 63. Therefore, the configuration of the digital TV 3 of the fourth embodiment will not be described.

The operations of the fourth embodiment DVD player 1 and digital TV 3 will now be described. The following description refers only to the operations of the packeting circuit 45 and the unpacketing circuit 63 because the operations of the sections other than the packeting circuit 45 and the unpacketing circuit 63 are the same as those in the first embodiments.

The operation of the packeting circuit 45 will first be described with reference to the flowchart of FIG. 17. In step S1, the packeting circuit 45 in the fourth embodiment previously divides an MPEG2-PS data pack of 2,048 bytes shown in FIG. 16(A) into the first number of fractions $FN_1$ (=8), thereby forming, as shown in FIG. 16(B), eight groups of data each consisting of 256 bytes as source packets to be transmitted in isochronous communication in accordance with IEEE 1394.

Next, in step S2, a 4-byte source packet header is added to the headmost end of each source packet formed in step S1. That is, a time stamp is added in order to reduce jitter at the time of transmission. The process then advances to step S3 to add 28-byte padding data to the hindmost end of each source packet in order to form data blocks of the quadlet unit size, as described below. In this manner, a 288-byte source packet is formed, as shown in FIG. 16(C).

Figure 16:
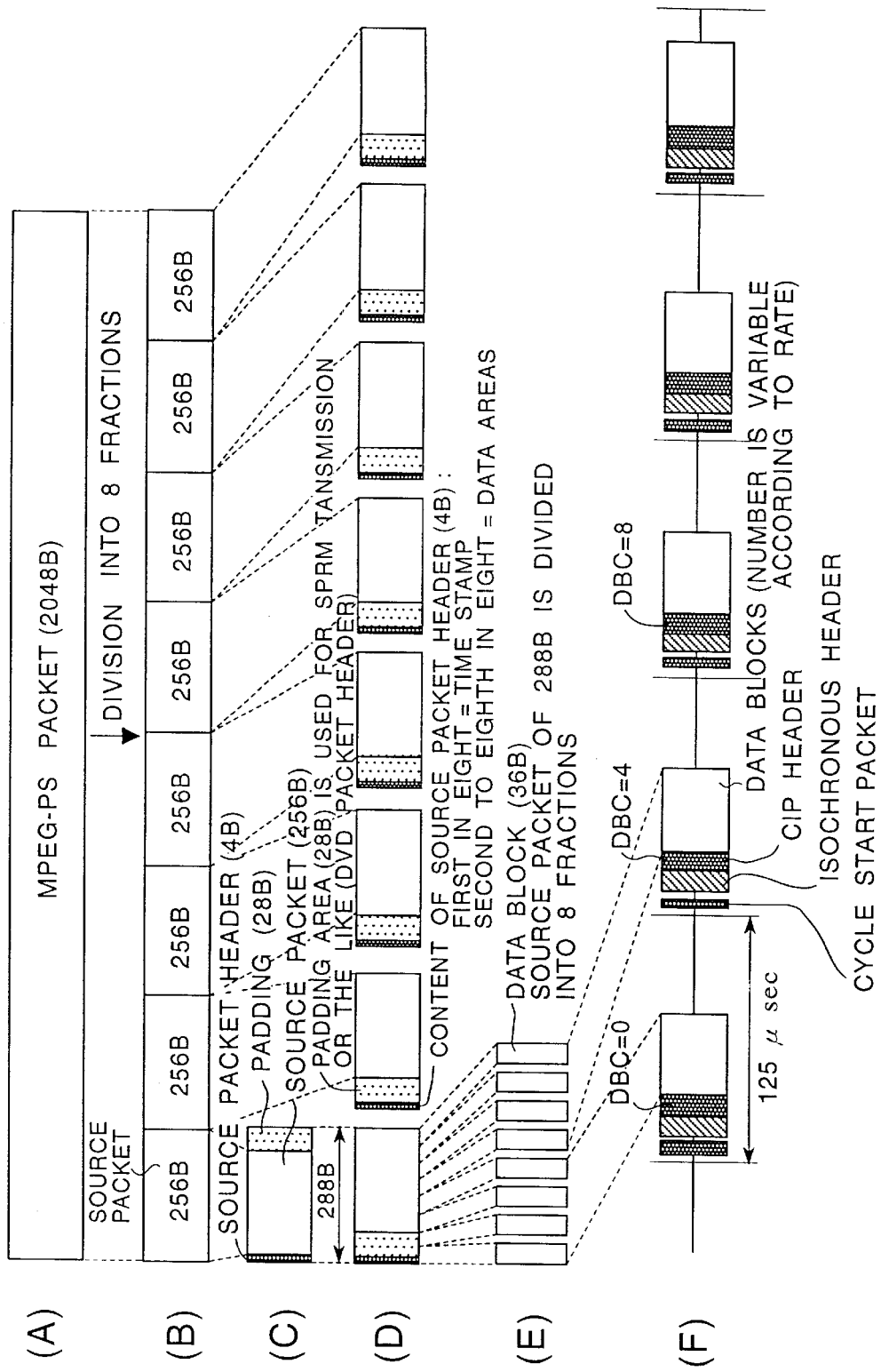
FIG. 16 is a diagram showing an example of a procedure for forming packets in a fourth embodiment of the present invention.
Figure 17:
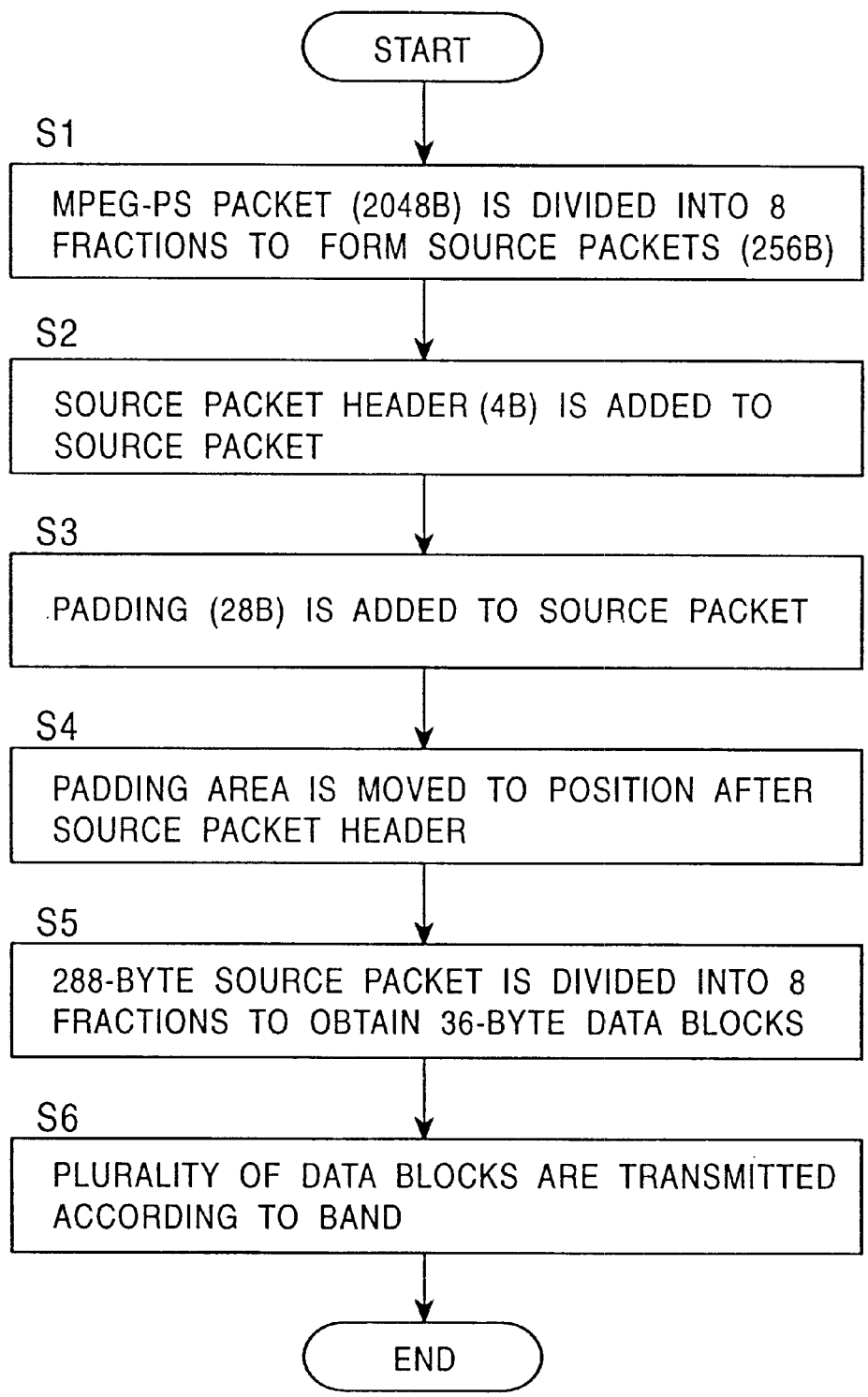
FIG. 17 is a flowchart for explaining the procedure for forming packets in the fourth embodiment.

In step S4, the area in which padding data is added in step S3 is moved to the position immediately after the source packet header to be used for transmission of a system parameter (SPRM) or the like, as shown in FIG. 16(D). This is because processing of the data is easier if the data area is closer to the headmost end.

In the source packet headers added to the source packets, each of those added to the second and other subsequent source packet headers in the eight source packet headers may be used as a data area. No information is written if they are not used as data areas.

In step S5, each 288-byte source packet is divided into the second number of fractions $FN_2$ (8 in this case), thereby obtaining 36-byte data blocks, as shown in FIG. 16(E).

The process then advances to step S6 and the packeting circuit 45 forms a CIP header and forms a packet containing the CIP header and a predetermined number of data blocks.

Figure 18:
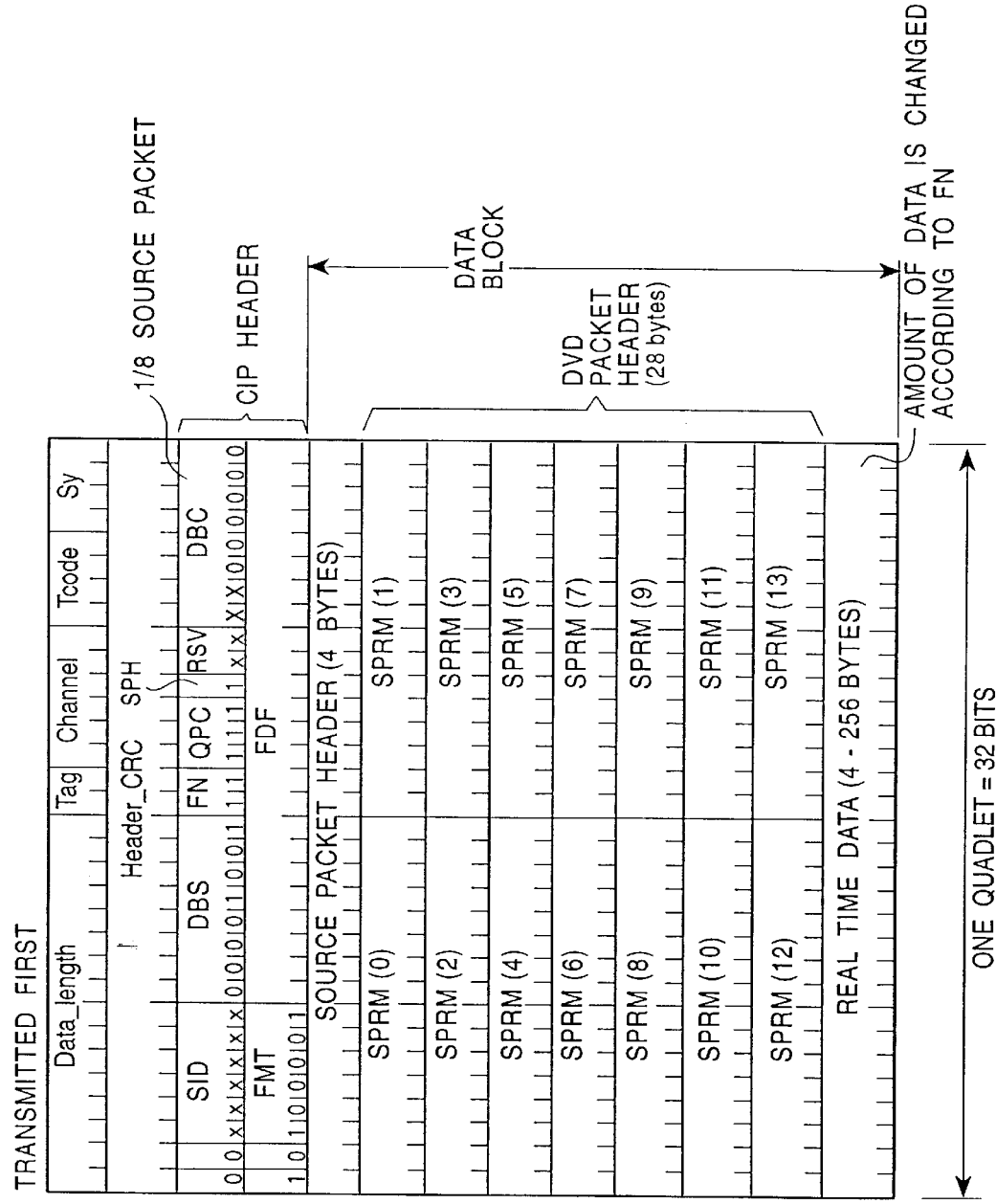
FIG. 18 is a diagram showing a format of transmitted data.
Figure 20:
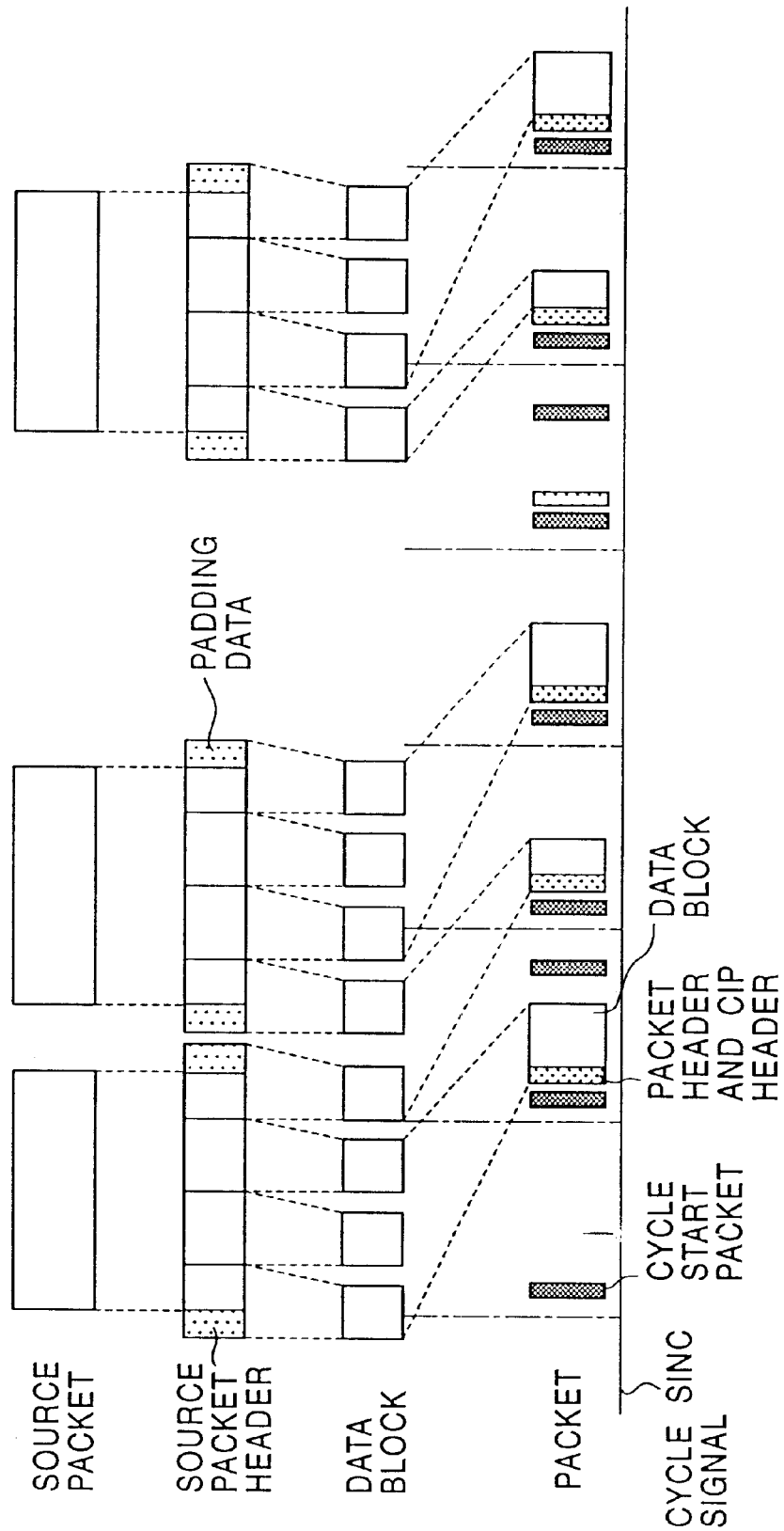
FIG. 20 is a diagram showing an example of the relationship between original data and transmitted packets.
Figure 21:
FIG. 21 is a diagram showing the format of a source packet header.
Figure 22:
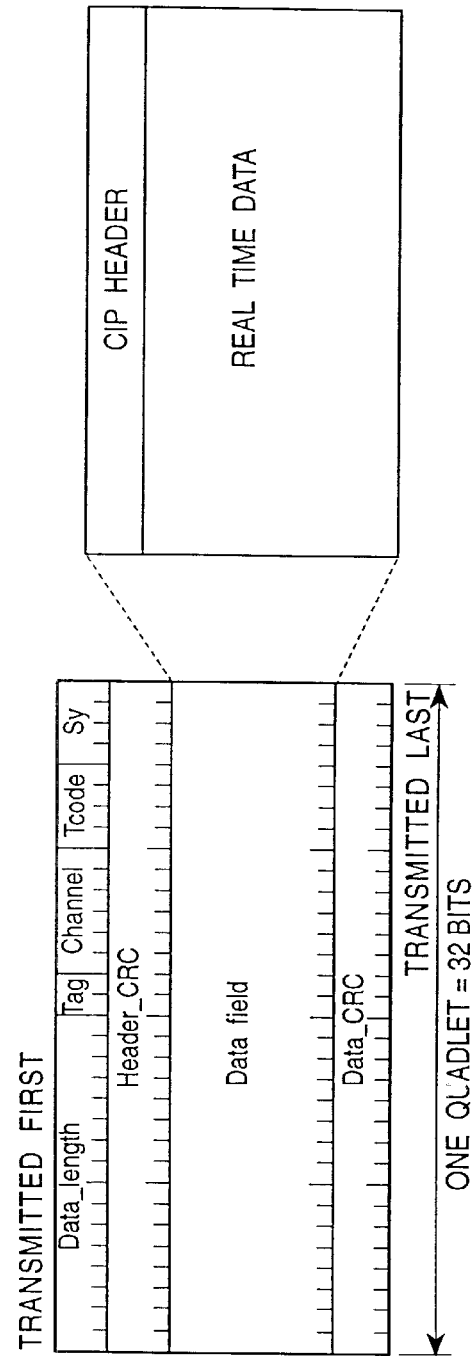
FIG. 22 is a diagram showing the structure of a packet for isochronous communication.

FIG. 18 shows an example of a CIP header format and a data block format used in the fourth embodiment. As shown in FIG. 18, the same CIP header format as the conventional one having no SYT area as shown in FIG. 26 may be used. In this example, the value in the DBS area is 00001001 (binary), the value in the FN area is 11 (binary) and the value in the QPC area is 111 (binary). Therefore, the data block length is 9 quadlets, i.e., 36 bytes, the number of fractions in which one pack is divided is 8 ($=2^3$), and the padding data length is 7 quadlets, i.e., 28 bytes.

The packeting circuit 45 sets a number of data blocks per packet according to the band, forms a packet using the number of data blocks corresponding to the set number, and outputs the formed packet to the communication control section 49.

The communication control section 49 outputs a control signal to the timer 47 in every 125 μsec cycle at the start of the cycle, and simultaneously outputs a cycle sync signal and a cycle start packet to the communication section 50. Also, the communication control section 49 is supplied with packets from the packeting circuit 45 and outputs the packets to the communication section 50 one in every cycle.

The communication section 50 transmits, over the AV bus 2, cycle sync signals, start packets and isochronous communication packets supplied from the communication control section 49.

The process ends thereby. The above-described process is repeated the number of times corresponding to the number of packets.

In the above-described manner, MPEG-PS data is converted into isochronous communication packets and the packets are transmitted over the AV bus 2.

The communication section 61 of the digital TV 3 receives cycle sync signals, cycle start packets and isochronous communication packets transmitted from the DVD player 1 via the AV bus 2, and outputs the received signals and packets to the communication control section 62.

When supplied with one cycle sync signal, the communication control section 62 outputs a control signal according to the cycle sync signal to the timer 64, and outputs the corresponding supplied isochronous communication packet to the unpacketing circuit 63.

The unpacketing circuit 63 reads the CIP header of each of supplied isochronous communication packets and restores source packets with added time stamps and padding data each from at least one packet corresponding to $FN_2$ data blocks (eight blocks in this case).

In this embodiment, since the value in the FMT area of each CIP header is set to 100001, the unpacketing circuit 63 performs processing by assuming that data formed as a 2,048-byte MPEG2-PS packet has been divided into 8 source packets, and that each source packet has been further divided to form data blocks.

The unpacketing circuit 63 outputs head 4-byte time stamps to the adder 65, restores the MPEG-PS data pack of 2,048 bytes from 8 (the number of source packets)×8 (the number of data blocks obtained by dividing each source packet) (=64) data blocks, as described below, and outputs the restored MPEG-PS data to the FIFO memory 64.

The method of restoring the MPEG2-PS data pack of 2,048 bytes from the 64 data blocks will next be described. The unpacketing circuit 63 discriminates each of the source packets containing the data blocks on the basis of the value in the DBC area of the corresponding CIP header.

That is, if all the lower six digits of the value in the DBC area of the CIP header of one packet are 0, the first data block contained in the packet is recognized as the head data block in one MPEG2-PS packet. Also, if all the lower three digits of the value in the DBC area of the CIP header of one packet are 0, the first data block contained in the packet is recognized as the head data block in one source packet.

For example, if the value of DBC is XX000000 (binary) (X is 0 or 1), the data block is recognized as the head data block in the first one of eight source packets, i.e., the head data block in one MPEG2-PS data pack.

If the value of DBC is XX001000 (binary), the data block is recognized as the head data block in the second one of eight source packets. If the value of DBC is XX010000 (binary), the data block is recognized as the head data block in the third one of eight source packets. If the value of DBC is XX011000 (binary), the data block is recognized as the head data block in the fourth one of eight source packets. If the value of DBC is XX100000 (binary), the data block is recognized as the head data block in the fifth one of eight source packets. If the value of DBC is XX101000 (binary), the data block is recognized as the head data block in the sixth one of eight source packets. If the value of DBC is XX110000 (binary), the data block is recognized as the head data block in the seventh one of eight source packets. If the value of DBC is XX111000 (binary), the data block is recognized as the head data block in the eighth one of eight source packets.

The unpacketing circuit 63 first restores the eight source packets from the data blocks contained in the packets supplied from the communication control section 62, as described above, then restores the MPEG2-PS data pack of 2,048 bytes, and outputs the restored data pack to the FIFO memory 67. Thus, each source packet divided into 8 blocks can be discriminated by referring to the values in the DBC areas. The restored data is output to the decoding section 22 to be decoded.

FIG. 19 shows the set of values in the CIP header. The value in the SID area is set according to the configuration. The value in the DBS area is 00001001 (binary) (=9 quadlets (=36 bytes)). The value in the FN area is 11 (binary) (=8). The value in the QPC area is 111 (binary) (=7). The value in the SPH area is 1. The value 0 to FF (hexadecimal) (0 to 255) is set in the DBC area. The value in the FMT area is 100001 denoting MPEG2-PS. In the FDF area, a predetermined value is set as desired.

In the fourth embodiment, as described above, an MPEG-PS data pack of 2,048 bytes is divided by using the conventional CIP header to form source packets, groups of data formed by adding time stamps and padding data to the source packets are further divided to form data blocks, and packets each having a predetermined number of data blocks are transmitted, thereby transmitting in an isochronous communication manner the pack of 2,048 bytes to the digital TV 3 operating as a decoder through the digital interface in accordance with the IEEE 1394 standard.

In the above-described fourth embodiment, as described above, each source packet can easily be discriminated, so that the padding area (DVD packet header and the source packet header can be treated independently with respect to source packets containing them. As a result, the usable data area can be increased.

Also, an MPEG2-PS packet can be transmitted in an isochronous transmission manner by using the conventional CIP header. In such a case, an MPEG2-PS packet of 2,048 bytes can be transmitted by being fragmentized into, for example, 36-byte data blocks, thus achieving efficient use of the transmission band.

In the above-described embodiments, data is transmitted between DVD player 1 and digital TV 3. However, needless to say, data can also be transmitted between other apparatuses having data communication sections in accordance with the IEEE 1394 standard.

In the above-described embodiments, 4-byte time stamps are used. However, time stamps of 8 bytes or more and having a byte length of a multiple of 4 may also be used.

In the transmitting apparatus and the transmitting method of the present invention, a pack of 2,048 bytes in data is converted into at least one packet to be transmitted in isochronous communication in accordance with the IEEE 1394 standard. Therefore, 2,048 bytes of data can be communicated by using the digital interface in accordance with the IEEE 1394 standard.

In the receiving apparatus and the receiving method of the present invention, packets transmitted in communication in accordance with the IEEE 1394 standard are received and a pack of 2,048 byte is restored from at least one of the received packets. Thus, 2,048 bytes of data can be communicated by using the digital interface in accordance with the IEEE 1394 standard.

What is claimed is:

1. A transmitting apparatus transmitting data through a digital interface, said transmitting apparatus comprising:
   pack input means for input of a pack;
   data block generating means for generating and outputting data blocks by dividing said entered pack;
   packet converting means for converting output data blocks in a predetermined number into a packet; and
   packet delivery means delivering said packet;
   wherein said packet has at least a first area showing a number of fractions for packeting, and a second area serving as a supplemental area for said first area showing the number of fractions when said pack exceeds a predetermined data length.

2. A transmitting apparatus according to claim 1, wherein said packet has also a third area showing a padding data length for adjusting the total length of data, and a fourth area to be used in response to a data format of said pack; when said pack exceeds said predetermined data length, said packet further has a fifth area serving as a supplemental area for said third area showing a padding data length, together with said second area, within said fourth area.

3. A transmitting apparatus according to claim 2, wherein said data block generating means comprising:
  (1) data adding means for generating data by adding padding data and a time stamp for adjusting the total length of data to said entered pack; and
  (2) data dividing means for dividing said generated data into a predetermined number of fractions, and generating said data block.

4. A transmitting apparatus according to claim 3, wherein the data format of said pack is in the MPEG-PS format.

5. A transmitting apparatus according to claim 3, wherein said digital interface is an IEEE 1394 digital interface.

6. A transmitting apparatus according to clam 5, wherein said packet converting means forms said data blocks having a byte length of a multiple of 4 by dividing said data comprising said pack having 2,048 bytes, said time stamp having a byte length of a multiple of 4, and said padding data having a byte length of a multiple of 4 into said number of fractions which is a multiple of 2, converts said data blocks in the predetermined number into said packet, and transmits the same.

7. A transmitting apparatus according to claim 6, wherein, if the number of fractions is FN; the number of data blocks per packet is DB; and the rate of supply of the data is R bits/second, the number of fractions and the number of data blocks per packet are set to values of FN and DB satisfying a condition:

$$\{2048*8/(125*0.000001))/FN\}*DB>=R.$$

8. A transmitting apparatus transmitting data through a digital interface, said transmitting apparatus comprising:
  pack input means for input of a pack;
  data block generating means for generating and outputting data blocks by dividing said entered pack;
  packet converting means converting output data block in a predetermined number into a packet; and
  packet delivery means delivering said packet;
  wherein said packet has at least a first area showing the padding data length for adjusting the total data length, and a second area serving as a supplemental area for said first area showing the padding data length when said pack exceeds the predetermined data length.

9. A transmitting apparatus according to claim 8, wherein said data block generating means comprises:
  (1) data adding means for adding padding data for adjusting the total length of data to said entered pack to generate and output data; and
  (2) data dividing means dividing said output data into a first number of fractions, adding a time stamp to each of the generated source packets, and then, dividing into a second number of fractions, thereby generating said data blocks in a predetermined number.

10. A transmitting apparatus according to claim 9, wherein said packet converting means divides data formed of said pack of 2,048 bytes and padding data having a byte length of a multiple of 4 into a first number of fractions, forms time-stamped source packets having a byte length of a multiple of 16 by adding a time stamp having a byte length of a multiple of 4 to each of said generated source packets, forms data blocks having a byte length of a multiple of 4 by further dividing each of the time-stamped source packets into a second number of fractions which is a multiple of 2, and forms said packet by setting a predetermined number of the data blocks per packet to be transmitted as data in the packet.

11. A transmitting apparatus according to claim 10, wherein said pack has the MPEG-PS data format.

12. A transmitting apparatus according to claim 10, wherein said digital interface is an IEEE 1394 digital interface.

13. A transmitting apparatus according to claim 8, wherein said packet has also a third area used in response to the data format of said pack; and when said pack exceeds said predetermined data length, said pack has further said second area in said third area.

14. A transmitting apparatus according to claim 12, wherein, if the first and second numbers of fractions are FN1 and FN2, respectively; the number of data blocks per packet is DB; and the rate of supply of the data is R bits/second, said packet converting means sets the first and second numbers of fractions and the number of data blocks per packet to values of FN1, FN2 and DB satisfying a condition:

$$\{(2048*8/(125*0.000001)/(FN1*FN2)\}DB>=R.$$

15. A transmitting apparatus according to claim 1, wherein said packet has also a third area used in response to the data format of said pack, and when said pack exceeds said predetermined data length, said pack has further said second area in said third area.

16. A transmitting apparatus according to claim 15, wherein said packet has also a fourth area set for synchronizing for each video frame, and when said pack exceeds said predetermined data length, said packet converting means further has means for writing a time stamp in said fourth area.

17. A transmitting apparatus according to claim 16, wherein said packet converting means divides said pack of 2,048 bytes into said number of fractions of a multiple of 2, forms said data blocks having a byte length of a multiple of 4, and converts each of the thus formed data blocks in a predetermined number into said packet.

18. A transmitting apparatus according to claim 17, wherein said digital interface is an IEEE 1394 digital interface.

19. A transmitting apparatus according to claim 17, wherein said pack has the MPEG-PS data format.

20. A transmitting apparatus according to claim 18, wherein, if the number of fractions is FN; the number of data blocks per packet is DB; and the rate of supply of the data is R bits/second, said packet converting means sets the number of fractions and the number of data blocks per packet to values of FN and DB satisfying a condition:

$$\{2048*8/(125*0.000001))/FN\}*DB>=R.$$

21. A transmitting apparatus transmitting data through a digital interface, said transmitting apparatus comprising:
  pack input means for input of a pack;
  data block generating means for generating an outputting data blocks by dividing said entered pack;
  packet converting means converting output data blocks in a predetermined number into a packet; and
  packet delivery means delivering said packet;
  wherein, if said pack exceeds said predetermined data length, said data block generating means comprises first dividing means dividing said entered pack into a first number of fractions; data adding means generating data by adding a time stamp and padding data to each of source packets generated by said first dividing means; and second dividing means generating said data blocks by dividing said generated data into a second number of fractions.

22. A transmitting apparatus according to claim 21, wherein said packet has at least a first area showing a lack detecting counter of packet.

23. A transmitting apparatus according to claim 21, wherein said packet converting means divides said pack of 2,048 bytes entered from said pack input means into said first number of fractions which is a multiple of 2, forms said data by adding said time stamp having a byte length of a multiple of 4 and said padding data having a byte length of a multiple of 4 and said padding data having a byte length of a multiple of 4 to each of said formed source packets, forms said data blocks having a byte length of a multiple of 4 by dividing each of said data into said second number of fractions which is a multiple of 2, and converts and transmits said data blocks in a predetermined number to said packet.

24. A transmitting apparatus according to claim 24, wherein said digital interface is an IEEE 1393 digital interface.

25. A transmitting apparatus according to claim 23, wherein said pack has the MPEG-PS data format.

26. A transmitting apparatus according to claim 21, wherein said data adding means further has means for writing system parameters as said padding data.

27. A transmitting apparatus according to claim 21, wherein said data adding means has means for providing said padding data area immediately after said time stamp.

28. A transmitting apparatus according to claim 26, wherein said data adding means has means for writing DVD parameters as said system parameters.

29. A transmitting apparatus according to claim 22, wherein said packet converting means has also means for writing a serial number of the first data block in said data block.

30. A receiving apparatus receiving a packet having at least a first area showing a data format of the pack and a second area used in response to the data format of said pack through a digital interface, said receiving apparatus comprising:
packet input means for input of said packet; and
unpacketing means for restoring data comprising a pack, a time stamp and padding data from said entered packets in a predetermined number;
wherein said unpacketing means comprises:
detecting means for detecting the data format of said pack from the first area in said packet; data restoring means for reading out the number of data fractions for packeting and the padding data length for adjusting the total length of said data from said second area and restoring said data in response to said number of data fractions when said data format is a specific data format; and extracting means for extracting said pack and said time stamp from said restored data.

31. A receiving apparatus according to claim 30, wherein said digital interface is an IEEE 1394.

32. A receiving apparatus according to claim 30, wherein said pack has the MPEG-PS data format.

33. A receiving apparatus according to claim 30, wherein said unpacketing means restores said packet to said data comprising said pack of 2,048 bytes, said time stamp having a byte length of a multiple of 4, and said padding data having a byte length of a multiple of 4.

34. A receiving apparatus according to claim 30, wherein said receiving apparatus further has a third area showing the number of data fractions for packing, and a fourth area showing the padding data length for adjusting the total length of data; and
said unpacketing means comprises, when said data format is said specific format, data restoring means for reading out said number of data fractions and said padding data length from the second, third and fourth areas in said packet, and restoring said data in response to said number of data fractions, and extracting means for extracting said pack and said time stamp from said restored data.

35. A receiving apparatus according to claim 34, wherein said digital interface is an IEEE 1394.

36. A receiving apparatus according to claim 34, wherein said pack has the MPEG-PS data format.

37. A receiving apparatus according to claim 34, wherein said unpacketing means restores said packet to said data comprising said pack of 2,048 bytes, said time stamp having a byte length of a multiple of 4, and said padding data having a byte length of a multiple of 4.

38. A receiving apparatus for receiving a packet having at least first area showing a number of data fractions for packeting, a second area showing a padding data length for adjusting the total length of data, a third area showing the data format of the pack, and a fourth area used in response to the data format of said pack, through a digital interface, said receiving apparatus comprising:
packet input means for input of said packet; detecting means for detecting the data format of said pack from the third area in said packet; time-stamped source packet generating means for restoring a time-stamped source packet by reading out said number of data fractions from the first area in said packet when said data format is a specific format; a source packet generating means for generating only the source packet from said time-stamped source packet; data restoring means for restoring the data from said source packets in a predetermined number; and pack restoring means for restoring the pack from said data on the basis of said padding data length by reading out the padding data length from said fourth area.

39. A receiving apparatus according to claim 38, wherein said unpacketing means restores said packet to said time-stamped source packet in a predetermined number having a byte length of a multiple of 16, extracts said time stamp from said time-stamped source packet, and restores said pack of 2,048 bytes from said source packets in the predetermined number.

40. A receiving apparatus according to claim 38, wherein said digital interface is an IEEE 1394 digital interface.

41. A receiving apparatus according to claim 38, wherein said pack has the MPEG-PS data format.

42. A receiving apparatus for receiving a packet having a first area showing the data format of a pack, a second area used in response to the data format of said pack, and a third area provided for synchronization for each video frame, through a digital interface, said receiving apparatus comprising:
packet input means for input of said packet; and
unpacketing means for restoring the pack from said entered packets in the predetermined number;
wherein said unpacketing means comprises detecting means for detecting the data format of said pack from the first area in said packet; data block restoring means for restoring the data blocks corresponding to the number of data fractions for packeting from said second area; and pack restoring means for restoring said pack from the data blocks in said predetermined number by reading out the time stamp from said third area.

43. A receiving apparatus according to claim 42, wherein said digital interface is an IEEE 1394 digital interface.

44. A receiving apparatus according to claim 42, wherein said pack has the MPEG-PS data format.

45. A receiving apparatus receiving a packet having at least a first area showing a number of data fractions for packeting, a second area showing the padding data length for adjusting the total length of the data, and a third area showing the data format of the pack, through a digital interface, said receiving apparatus comprising:

packet input means for input of the packet; detecting means for detecting the data format of said pack from the third area in said packet; data restoring means for restoring data comprising a source packet, a time stamp and padding data from data blocks in a predetermined number by reading out said number of data fraction for packeting from said first area when said data format is a specific format; source packet restoring means for restoring only said source packet from said data by reading out said padding data length from said second area; and pack restoring means for restoring the pack from said source packets in a predetermined number.

46. A receiving means according to claim 45, wherein said packet further has a fourth area for showing a packet lacking detecting counter; and said pack restoring means has pack restoring means for detecting the data format of said pack from the third area in said packet, restoring said source packets in the prescribed number by reading out an identification value from said fourth area when said data format is a specific format, and restoring said pack from the source packets in a predetermined number.

47. Transmitting method of transmitting data through a digital interface, said transmitting method comprising:

a pack input step for input of a pack;

a data generating step of generating and outputting data blocks by dividing said entered pack;

a packet converting step of converting output data blocks in a predetermined number into a packet; and a packet delivery step of delivering said packet;

wherein said packet has at least a first area showing a number of fractions for packeting, and a second area serving as a supplemental area for said first area showing the number of fractions when said pack exceeds a predetermined data length.

48. A transmitting method according to claim 47, wherein said packet has also a third area showing a padding data length for adjusting the total length of data, and a fourth area to be used in response to a data format of said pack; when said pack exceeds said predetermined data length, said packet further has a fifth are serving as a supplemental area for said third area showing a padding data length, together with said second area, within said fourth area.

49. A transmitting method according to claim 48, wherein said data block generating step comprises:

(3) data adding step of generating data by adding padding data and a time stamp for adjusting the total length of data to said entered pack; and (4) data dividing step of dividing said generated data into a predetermined number of fractions, and generating said data block.

50. A transmitting method according to claim 49, wherein the data format of said pack is in the MPEG-PS format.

51. A transmitting method according to claim 49, wherein said digital interface is an IEEE 1394 digital interface.

52. A transmitting method according to claim 51, wherein said packet converting step is to form said data blocks having a byte length of a multiple of 4 by dividing said data comprising said pack having 2,048 bytes, said time stamp having a byte length of a multiple of 4, and said padding data having a byte length of a multiple of 4 into said number of fractions which is a multiple of 2, convert said data blocks in the predetermined number into said packet, and transmit the same.

53. A transmitting method according to claim 52, wherein, if the number of fractions is FN; the number of data blocks per packet is DB; and the rate of supply of the data is R bits/second, the number of fractions and the number of data blocks per packet are set to values of FN and DB satisfying a condition:

$$\{2048*8/(125*0.000001))/FN\}*DB>=R.$$

54. A transmitting method of transmitting data through a digital interface, said transmitting method comprising:

a pack input step for input of a pack;

a data generating step of generating and outputting data blocks by dividing said entered pack;

a packet converting step of converting output data blocks in a predetermined number into a packet; and a packet delivery step of delivering said packet;

wherein said packet has at least a first area showing the padding data length for adjusting the total data length, and a second area serving as a supplemental area for said first area showing the padding data length when said pack exceeds the predetermined data length.

55. A transmitting method according to claim 54, wherein said data block generating step comprises:

(3) data adding step of adding padding data for adjusting the total length of data to said entered pack to generate and output data; and (4) data dividing step of dividing said output data into a first number of fractions, adding a time stamp to each of the generated source packets, and then, dividing into a second number of fractions, thereby generating said data blocks in a predetermined number.

56. A transmitting method according to claim 55, wherein said packet converting step is to divide data formed of said pack of 2,048 bytes and padding data having a byte length of a multiple of 4 into a first number of fractions, form source packets each having a time stamp having byte length of a multiple of 16 by adding a time stamp having a byte length of a multiple of 4 to each of said generated source packets, form data blocks having a byte length of a multiple of 4 by further dividing each of the source packets with time stamps into a second number of fractions which is a multiple of 2, and form said packet by setting a predetermined number of the data blocks per packet to be transmitted as data in the packet.

57. A transmitting method according to claim 56, wherein said pack has the MPEG-PS data format.

58. A transmitting method according to claim 56, wherein said digital interface is an IEEE 1394 digital interface.

59. A transmitting method according to claim 54, wherein said packet has also a third area used in response to the data format of said pack; and when said pack exceeds said predetermined data length, said pack has further said second area in said third area.

60. A transmitting method according to claim 58, wherein, if the first and second numbers of fractions are FN1 and FN2, respectively; the number of data blocks per packet is DB; and the rate of supply of the data is R bits/second, said packet converting step is to set the first and second numbers of fractions and the number of data blocks per packet to values of FN1, FN2 and DB satisfying a condition:

$$\{(2048*8/(125*0.000001)/(FN1*FN2)\}DB>R.$$

61. A transmitting method according to claim 47, wherein said packet has also a third area used in response to the data format of said pack, and when said pack exceeds said predetermined data length, said pack has further said second area in said third area.

62. A transmitting method according to claim 61, wherein said packet has also a fourth area set for synchronizing for each video frame, and when said pack exceeds said predetermined data length, said packet converting step further has a step of writing a time stamp in said fourth area.

63. A transmitting method according to claim 62, wherein said packet converting step is to divide said pack of 2,048 bytes into said number of fractions of a multiple of 2, form said data bocks having a byte length of a multiple of 4, and convert each of the thus formed data blocks in a predetermined number into said packet.

64. A transmitting method according to claims 63, wherein said digital interface is an IEEE 1394 digital interface.

65. A transmitting method according to claim 63, wherein said pack has the MPEG-PS data format.

66. A transmitting method according to claim 64, wherein, if the number of fractions is FN; the number of data blocks per packet is DB; and the rate of supply of the data is R bits/second, said packet converting step is to set the number of fractions and the number of data blocks per packet to values of FN and DB satisfying a condition:

$$\{2048*8/(125*0.000001))/FN\}*DB>=R.$$

67. A transmitting method transmitting data through a digital interface, said transmitting method comprising:

a pack input step for input of a pack;

a data block generating step of generating and outputting data blocks by dividing said entered pack;

a packet converting step of converting output data blocks in a predetermined number into a packet; and a packet delivery step of delivering said packet;

wherein, if said pack exceeds said predetermined data length, said data blocks generating step comprises a first dividing step of dividing said entered pack into a first number of fractions; a data adding step of generating data by adding a time stamp and padding data to each of source packets generated in said first dividing step; and a second dividing step of generating said data blocks by dividing said generated data into a second number of fractions.

68. A transmitting method according to claim 67, wherein said packet has at least a first area showing a lack detecting counter of packet.

69. A transmitting method according to claim 67, wherein said packet converting step is to divide said pack of 2,048 bytes entered in said pack input step into said first number of fractions which is a multiple of 2, form said data by adding said time stamp having a byte length of a multiple of 4 and said padding data having a byte length of a multiple of 4 to each of said formed source packets, form said data blocks having a byte length of a multiple of 4 by dividing each of said data into said second number of fractions which is a multiple of 2, and convert and transmit said data blocks in a predetermined number to said packet.

70. A transmitting method according to claim 69, wherein said digital interface is an IEEE 1394 digital interface.

71. A transmitting method according to claim 69, wherein said pack has the MPEG-PS data format.

72. A transmitting method according to claim 67, wherein said data adding step further has a step of writing system parameters as said padding data.

73. A transmitting method according to claim 67, wherein said data adding step has a step of providing said padding data area immediately after said time stamp.

74. A transmitting method according to claim 72, wherein said data adding step has a step of writing DVD parameters as said system parameters.

75. A transmitting method according to claim 68, wherein said packet converting step has also a step of writing a serial number of the first data block in said data block.

76. A receiving method of receiving a packet having at least a first area showing a data format of the pack and a second area used in response to the data format of said pack through a digital interface, said receiving method comprising:

a packet input step for input of said packet; and an unpacketing step of restoring data comprising a pack, a time stamp and padding data from said entered packets in a predetermined number;

wherein said unpacketing step comprises:

a detecting step of detecting the data format of said pack from the first area in said packet; a data restoring step of reading out the number of data fractions for packeting and the padding data length for adjusting the total length of said data from said second area and restoring said data in response to said number of data fractions when said data format is a specific data format; and an extracting step of extracting said pack and said time stamp from said restored data.

77. A receiving method according to claim 76, wherein said digital interface is an IEEE 1394.

78. A receiving method according to claim 76, wherein said pack has the MPEG-PS data format.

79. A receiving method according to claim 76, wherein said unpacketing step is to restore said packet to said data comprising said pack of 2,048 bytes, said time stamp having a byte length of a multiple of 4, and said padding data having a byte length of a multiple of 4.

80. A receiving method according to claim 76, wherein said receiving method further has a third area showing the number of data fractions for packeting, and a fourth area showing the padding data length for adjusting the total length of data; and said unpacketing step comprises, when said data format is said specific format, a data restoring step of reading out said number of data fractions and said padding data length from the second, third and fourth areas in said packet, and restoring said data in responses to said number of data fractions, and an extracting step of extracting said pack and said time stamp from said restored data.

81. A receiving method according to claim 80, wherein said digital interface is an IEEE 1394.

82. A receiving method according to claim 80, wherein said pack has the MPEG-PS data format.

83. A receiving method according to claim 80, wherein said unpacketing step is to restore said packet to said data comprising said pack of 2,048 bytes, said time stamp having a byte length of a multiple of 4, and said padding data having a byte length of a multiple of 4.

84. A receiving method of receiving a packet having at least a first area showing a number of data fractions for packeting, a second area showing a padding data length for adjusting the total length of data, a third area showing the data format of the pack, and a fourth area used in response to the data format of said pack, through a digital interface, said receiving method comprising:

a packet input step of input of said packet; a detecting step of detecting the data format of said pack from the third area in said packet; a time-stamped source packet generating step of restoring a time-stamped source packet by reading out said number of data fractions from the first area in said packet when said data format is a specific format; a source packet generating step of generating only the source packet from said time-stamped source packet; a data restoring step of restoring the data from said source packets in a predetermined number; and a pack restoring step of restoring the pack from said data on the basic of said padding data length by reading out the padding data length from said fourth area.

85. A receiving method according to claim 84, wherein said unpacketing step is to restore said packet to said time-stamped source packets in a predetermined number having a byte length of a multiple of 16, extract said time stamp from said time-stamped source packet, and restore said pack of 2,048 bytes from said source packets in the predetermined number.

86. A receiving method according to claim 84, wherein said digital interface is an IEEE 1394 digital interface.

87. A receiving method according to claim 84, wherein said pack has the MPEG-PS data format.

88. A receiving method of receiving a packet having a first area showing the data format of a pack, a second area used in response to the data format of said pack, and a third area provided for synchronization for each video frame, through a digital interface, said receiving method comprising:

a packet input step for input of said packet; and an unpacketing step of restoring the pack from said entered packets in the predetermined number;

wherein said unpacketing step comprises a detecting step of detecting the data format of said pack from the first area in said packet; a data block restoring step of restoring the data blocks corresponding to the number of data fractions for packeting from said second area; and a pack restoring step of restoring said pack from the data blocks in said predetermined number by reading out the time stamp from said third area.

89. A receiving method according to claim 88, wherein said digital interface is an IEEE 1394 digital interface.

90. A receiving method according to claim 88, wherein said pack has the MPEG-PS data format.

91. A receiving method of receiving a packet having at least a first area showing a number of data fractions for packeting, a second area showing the padding data length for adjusting the total length of the data, and a third area showing the data format of the pack, through a digital interface, said receiving method comprising:

a packet input step for input of the packet; a detecting step of detecting the data format of said pack from the third area in said packet; a data restoring step of restoring data comprising a source packet, a time stamp and padding data from data blocks in a predetermined number by reading out said number of data fraction for packeting from said first area when said data format is a specific format; a source packet restoring step of restoring only said source packet from said data by reading out said padding data length from said second area; and a pack restoring step of restoring the pack from said source packets in a predetermined number.

92. A receiving method according to claim 91, wherein said packet further has a fourth area for showing a packet lacking detecting counter; and said pack restoring step has a pack restoring step of detecting the data format of sid pack from the third area in said packet, restoring said source packets in the prescribed number by reading out and identification value from said fourth area when said data format is a specific format, and restoring said pack from the source packets in a predetermined number.

* * * * *